(12) United States Patent
Sugiyama et al.

(10) Patent No.: US 8,918,664 B2
(45) Date of Patent: Dec. 23, 2014

(54) INTEGRATED CIRCUIT, COMPUTER SYSTEM, AND CONTROL METHOD, INCLUDING POWER SAVING CONTROL TO REDUCE POWER CONSUMED BY EXECUTION OF A LOOP

(75) Inventors: Masashi Sugiyama, Kanagawa (JP); Masahiko Saito, Kanagawa (JP)

(73) Assignee: Panasonic Corporation, Osaka (JP)

( * ) Notice: Subject to any disclaimer, the term of this patent is extended or adjusted under 35 U.S.C. 154(b) by 457 days.

(21) Appl. No.: 13/395,985

(22) PCT Filed: Jun. 7, 2011

(86) PCT No.: PCT/JP2011/003185
§ 371 (c)(1),
(2), (4) Date: Mar. 14, 2012

(87) PCT Pub. No.: WO2011/161884
PCT Pub. Date: Dec. 29, 2011

(65) Prior Publication Data
US 2012/0179924 A1    Jul. 12, 2012

(30) Foreign Application Priority Data

Jun. 25, 2010   (JP) .................. 2010-144799

(51) Int. Cl.
*G06F 1/32* (2006.01)
(52) U.S. Cl.
CPC ..................... *G06F 1/32* (2013.01)
USPC .................... 713/320

(58) Field of Classification Search
CPC ..................... G06F 1/3243
USPC ..................... 713/320
See application file for complete search history.

(56) References Cited

U.S. PATENT DOCUMENTS 5,809,326 A    9/1998 Nogami
7,721,127 B2 *  5/2010 Vishin et al. ............... 713/322
(Continued)

FOREIGN PATENT DOCUMENTS

JP    8-69411    3/1996
JP    9-91136    4/1997
(Continued)

OTHER PUBLICATIONS

T. Li, A. R. Lebeck, and D.J. Sorin, "Spin Detection Hardware for Improved Management of Multithreaded Systems," IEEE Transactions on Parallel and Distributed Systems, vol. 17, No. 6, Jun. 2006.*
International Search Report issued Sep. 6, 2011 in International (PCT) Application No. PCT/JP2011/003185.

*Primary Examiner* — Albert Wang
(74) *Attorney, Agent, or Firm* — Wenderoth, Lind & Ponack, L.L.P.

(57) ABSTRACT

An integrated circuit provided with a processor includes a loop detection unit that detects execution of a loop in the processor, a loop-carried dependence analysis unit that analyzes the loop in order to detect loop-carried dependence, and a power control unit that performs power saving control when no loop-carried dependence is detected. By detecting whether a loop has loop-carried dependence, loops for calculation or the like can be excluded from power saving control. As a result, a larger variety of busy-waits can be detected, and the amount of power wasted by a busy-wait can be reduced.

22 Claims, 34 Drawing Sheets

(56) References Cited

U.S. PATENT DOCUMENTS

| | | |
|---|---|---|
| 2004/0210723 A1 | 10/2004 | Naruse et al. |
| 2009/0055635 A1 | 2/2009 | Tani |
| 2009/0070772 A1 | 3/2009 | Shikano |
| 2009/0113191 A1 | 4/2009 | Hall et al. |
| 2010/0064106 A1 | 3/2010 | Yamada et al. |
| 2011/0029763 A1 | 2/2011 | Tani |

FOREIGN PATENT DOCUMENTS

| | | |
|---|---|---|
| JP | 2009-53861 | 3/2009 |
| JP | 2009-69921 | 4/2009 |
| JP | 4253796 | 4/2009 |
| JP | 2009-146243 | 7/2009 |
| JP | 2010-66892 | 3/2010 |
| WO | 03/040948 | 5/2003 |

* cited by examiner

FIG.3

Instruction set 1400

| Instruction 1401 | Outline 1402 | Description of calculation 1403 | |
|---|---|---|---|
| ADD Rd, Rs, Rt | Addition | Rd <= Rs + Rt; | 1411 |
| SUB Rd, Rs, Rt | Subtraction | Rd <= Rs - Rt; | 1412 |
| CMP Rs, Rt | Comparison | If (Rs = Rt)<br>then CFR <= 0;<br>else CFR <= 1; | 1413 |
| MOV Rd, Rt | Movement | Rd <= Rt; | 1414 |
| BNE addr | Conditional branch | If (CFR=1)<br>then PC <= addr; | 1415 |
| JMP addr | Jump | PC <= addr; | 1416 |
| LDR Rd, (Rt) | Load | Store in Rd the value stored at the address indicated by Rt | 1417 |
| STR Rs, (Rt) | Store | Store Rs at the address indicated by Rt | 1418 |
| NOP | NOP | Perform no calculation | 1419 |

FIG.4

Register set 1500

| Name 1501 | Identifier of register(s) 1502 |
|---|---|
| General purpose register 1511 | R0, R1, R2, R3, R4, R5 |
| Program counter 1512 | PC |
| Condition flag register 1513 | CFR |

FIG.5

Instruction sequence 1600

| Address 1601 | Instruction 1602 |
|---|---|
| 1000 | ADD R1, R1, 4 |
| 1004 | NOP |
| 1008 | LDR R0, (R2) |
| 100c | CMP R0, R1 |
| 1010 | BNE 1004 |
| 1014 | SUB R3, R4 |

FIG.7

Loop range storage unit 1900

| Starting address 1911 | Address 1004 |
|---|---|
| Ending address 1912 | Address 1010 |

FIG.8

Instruction sequence forming a loop 2100

| Address | Instruction |
|---------|-------------|
| 1004    | NOP         |
| 1008    | LDR R0, (R2) |
| 100c    | CMP R0, R1  |
| 1010    | BNE 1004    |

FIG.10

Dependence analysis buffer 2200

| Mnemonic 2201 | DST register 2202 | SRC register 2203 | Entry number 2204 | Iteration number 2205 | Entry number of a prior instruction on which current instruction is dependent 2206 | Cross-iteration dependence determination result 2207 |
|---|---|---|---|---|---|---|
| NOP | | | No. 1 | 1 | | |
| LDR | R0 | R2 | No. 2 | 1 | External to loop (R2) | NO |
| CMP | CFR | R0, R1 | No. 3 | 1 | R0: No. 2<br>R1: External to loop | NO |
| BNE | | CFR | No. 4 | 1 | | |
| NOP | | | No. 5 | 2 | | |
| LDR | R0 | R2 | No. 6 | 2 | R2: External to loop | NO |
| CMP | CFR | R0, R1 | No. 7 | 2 | R0: No.6<br>R1: Internal to loop | NO |
| BNE | | CFR | No. 8 | 2 | | |

FIG.11

Instruction sequence forming a loop 2600

| Address | Instruction |
|---------|-------------|
| 2004 | ADD R2, R2, 4 |
| 2008 | LDR R0, (R2) |
| 200c | CMP R0, R1 |
| 2010 | BNE 2004 |

FIG.12

Dependence analysis buffer 2700

| Mnemonic 2201 | DST register 2202 | SRC register 2203 | Entry number 2204 | Iteration number 2205 | Entry number of a prior instruction on which current instruction is dependent 2206 | Cross-iteration dependence determination result 2207 |
|---|---|---|---|---|---|---|
| ADD | R2 | R2 | No. 1 | 1 | R2: External to loop | NO |
| LDR | R0 | R2 | No. 2 | 1 | R2: No.1 | NO |
| CMP | CFR | R0, R1 | No. 3 | 1 | R0: No. R1: External to loop | NO |
| BNE |  | CFR | No. 4 | 1 |  |  |
| ADD | R2 | R2 | No. 5 | 2 | R2: No.1 | YES |
| LDR | R0 | R2 | No. 6 | 2 | R2: No.5 | NO |
| CMP | CFR | R0, R1 | No. 7 | 2 | R0: No.6 R1: Internal to loop | NO |
| BNE |  | CFR | No. 8 | 2 |  |  |

FIG.21
Registers 2910
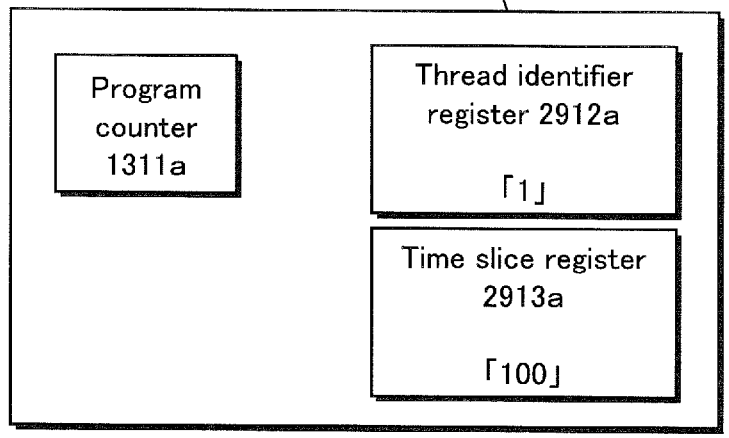
Registers corresponding to first thread 2910a
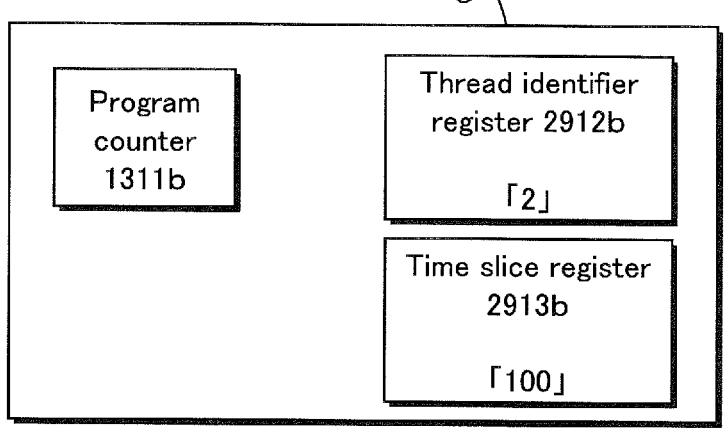
Registers corresponding to second thread 2910b

FIG.31

Instruction set 1400A

| Instruction 1401 | Outline 1402 | Description of calculation 1403 | |
|---|---|---|---|
| ADD Rd, Rs, Rt | Addition | Rd <= Rs + Rt; | 1411 |
| SUB Rd, Rs, Rt | Subtraction | Rd <= Rs - Rt; | 1412 |
| CMP Rs, Rt | Comparison | If (Rs = Rt) then CFR <= 0; else CFR <= 1; | 1413 |
| MOV Rd, Rt | Movement | Rd <= Rt; | 1414 |
| BNE addr | Conditional branch | If (CFR=1) then PC <= addr; | 1415 |
| JMP addr | Jump | PC <= addr; | 1416 |
| LDR Rd, (Rt) | Load | Store in Rd the value stored at the address indicated by Rt | 1417 |
| STR Rs, (Rt) | Store | Store Rs at the address indicated by Rt | 1418 |
| NOP | NOP | Perform no calculation | 1419 |
| READCLK | Read clock frequency | Acquire frequency of clock provided to processor | 1420 |

FIG.32

Instruction set 1400B

| Instruction 1401 | Outline 1402 | Description of calculation 1403 | |
|---|---|---|---|
| ADD Rd, Rs, Rt | Addition | Rd <= Rs + Rt; | 1411 |
| SUB Rd, Rs, Rt | Subtraction | Rd <= Rs - Rt; | 1412 |
| CMP Rs, Rt | Comparison | If (Rs = Rt)<br>then CFR <= 0;<br>else CFR <= 1; | 1413 |
| MOV Rd, Rt | Movement | Rd <= Rt; | 1414 |
| BNE addr | Conditional branch | If (CFR=1)<br>then PC <= addr; | 1415 |
| JMP addr | Jump | PC <= addr; | 1416 |
| LDR Rd, (Rt) | Load | Store in Rd the value stored at the address indicated by Rt | 1417 |
| STR Rs, (Rt) | Store | Store Rs at the address indicated by Rt | 1418 |
| NOP | NOP | Perform no calculation | 1419 |
| READCLK | Read clock frequency | Acquire frequency of clock provided to processor | 1420 |
| READTS | Read time slice | Acquire time slice allocated to logic processor | 1421 |

INTEGRATED CIRCUIT, COMPUTER SYSTEM, AND CONTROL METHOD, INCLUDING POWER SAVING CONTROL TO REDUCE POWER CONSUMED BY EXECUTION OF A LOOP

TECHNICAL FIELD

The present invention relates to an integrated circuit that includes a processor, to a computer system, and to a control method. In particular, the present invention relates to an integrated circuit, a computer system, and a control method for reducing power consumption when a processor performs a busy-wait.

BACKGROUND ART

In computer systems with processors, busy-waits are often used when waiting for user input or for synchronization between a plurality of processors (or a plurality of logic processors, processes, threads, or the like) operating in parallel. When a busy-wait is performed, a loop is executed in a processor to repeatedly check, for example, on a specific variable (such as a synchronization variable). Once the value of the specific variable changes to a predetermined value, the loop terminates, and the intended processing is performed.

In the case of a plurality of processors or the like operating in parallel, use of a busy-wait thus allows for one process to begin after another process finishes. Busy-waits are therefore widely used in computer systems.

Busy-waits have the demerit, however, of wasting processor resources. For example, the loop for repeatedly checking a synchronization variable may be executed from several hundred to tens of thousands of times or more. Therefore, a busy-wait is a wasteful control method from the perspective of power consumption.

To address this problem, Patent Literature 1 discloses a method for reducing wasted power consumption during a spin-wait, a type of busy-wait.

The following describes spin-waits with reference to FIG. 33. A spin-wait is used, for example, during synchronous processing in a multiprocessor. In FIG. 33, it is assumed that two processors are executing, in order, an earlier stage and a later stage of a process. A setting unit 1101 in the first processor, a verification unit 1102 in the second processor, and a synchronization variable 1110 form a spinlock (a type of interlock).

After writing a value of "0" into the synchronization variable 1110, the setting unit 1101 in the first processor performs step S1111 of the earlier stage. Upon completing step S1111 of the earlier stage, the first processor writes a value of "1" into the synchronization variable 1110. On the other hand, the verification unit 1102 of the second processor cannot start performing step S1122 for the later stage until the value of the synchronization variable 1110 becomes "1". Accordingly, the verification unit 1102 waits while repeating the determination in step S1121 until the value of the synchronization variable 1110 becomes "1" (in other words, the verification unit 1102 repeats a loop while waiting). This condition is referred to as "spinning" and is a waste of power.

Patent Literature 1 discloses a method wherein a computer detects when the processor executes an instruction sequence including a spin-wait, in which case the computer sets the processor to a power saving state. The method for detecting a spin-wait instruction is described next with reference to FIG. 34. FIG. 34 shows the structure of a spin-wait detection unit disclosed in Patent Literature 1.

A spin-wait detection unit 1222 includes an executed instruction sequence buffer 1234 for the processor, a spin-wait instruction sequence storage unit 1236, and a comparison unit 1238 that compares the instruction sequences in the executed instruction sequence buffer 1234 and the spin-wait instruction sequence storage unit 1236. The spin-wait instruction sequence storage unit 1236 stores interlock instruction sequences that are unique for spin-waits (such as test_and_set or compare_and_swap). The comparison unit 1238 outputs a spin-wait instruction detected signal 1241 upon detecting that an interlock instruction sequence stored in the instruction sequence storage unit 1236 is included in the executed instruction sequence buffer 1234. The processor treats the spin-wait instruction detected signal 1241 as a trigger for entering the power saving state.

CITATION LIST

Patent Literature

Patent Literature 1: Japanese Patent No. 4253796

SUMMARY OF INVENTION

Technical Problem

In the above conventional structure, a busy-wait is detected based on execution of a specific instruction sequence (such as test_and_set) stored in the instruction sequence storage unit 1236. This structure leads to the problem that a busy-wait using an instruction sequence other than the above specific instruction sequences cannot be detected. Furthermore, if busy-waits using a wide range of instruction sequences were to be detected with the above conventional structure, a wide variety of instruction sequences would need to be stored in the instruction sequence storage unit 1236. A limit would be reached, however, when trying to compare each of the variety of instruction sequences with the executed instruction sequences. In other words, a problem exists in that power consumption can be reduced only under limited circumstances, due to a limitation on the detectability of busy-waits.

In order to solve the problem in the above conventional technology, it is an object of the present invention to provide an integrated circuit, a computer system, and a control method that detect a wider variety of busy-waits and can reduce the amount of power wasted when a processor executes a busy-wait.

Solution to Problem

In order to solve the above problem, an integrated circuit according to the present invention is provided with a processor and comprises: a loop detection unit configured to detect execution of a loop in the processor, each iteration of the loop including one or more instructions; a loop-carried dependence analysis unit configured to analyze the loop in order to detect loop-carried dependence between instructions in two different iterations of the loop; and a power control unit configured to perform power saving control to reduce power consumed by execution of the loop when the loop-carried dependence analysis unit detects no loop-carried dependence in the loop.

Advantageous Effects of Invention

The integrated circuit according to the present invention can detect a loop using the loop detection unit and can distinguish whether the loop is for a busy-wait using the loop-carried dependence analysis unit. Accordingly, the integrated circuit can detect a loop for a busy-wait without comparing the loop with any specific instruction sequence (such as an instruction sequence for an interlock). The integrated circuit can therefore easily detect a loop for a busy-wait formed by an instruction sequence other than specific instruction sequences and perform power saving control during a busy-wait. As a result, a larger variety of busy-waits can be detected, and the amount of power wasted by performing a busy-wait can be reduced.

BRIEF DESCRIPTION OF DRAWINGS

FIG. 3 shows an example of an instruction set 1400 for a processor 1301 included in the integrated circuit according to Embodiment 1.

FIG. 4 shows an example of a register set 1500 for the processor 1301 according to Embodiment 1.

FIG. 5 shows an example of an instruction sequence 1600 in Embodiment 1.

FIG. 7 shows the data structure of a loop range storage unit 1900 in Embodiment 1.

FIG. 8 shows an example of an instruction sequence 2100 that forms a loop in Embodiment 1.

FIG. 10 shows data in a dependence analysis buffer 2200 used by the loop-carried dependence analysis unit 1702 in Embodiment 1.

FIG. 11 shows an example of an instruction sequence that forms a loop in Embodiment 1.

FIG. 12 shows data in a dependence analysis buffer 2700 used by the loop-carried dependence analysis unit 1702 in Embodiment 1.

FIG. 21 schematically shows the structure of registers 2910 in Embodiment 2.

FIG. 31 shows an example of another instruction set 1400A.

FIG. 32 shows an example of yet another instruction set 1400B.

DESCRIPTION OF EMBODIMENTS

The following describes embodiments of the present invention with reference to the drawings.

Embodiment 1

Structure of Computer System 1300

Figure 1:
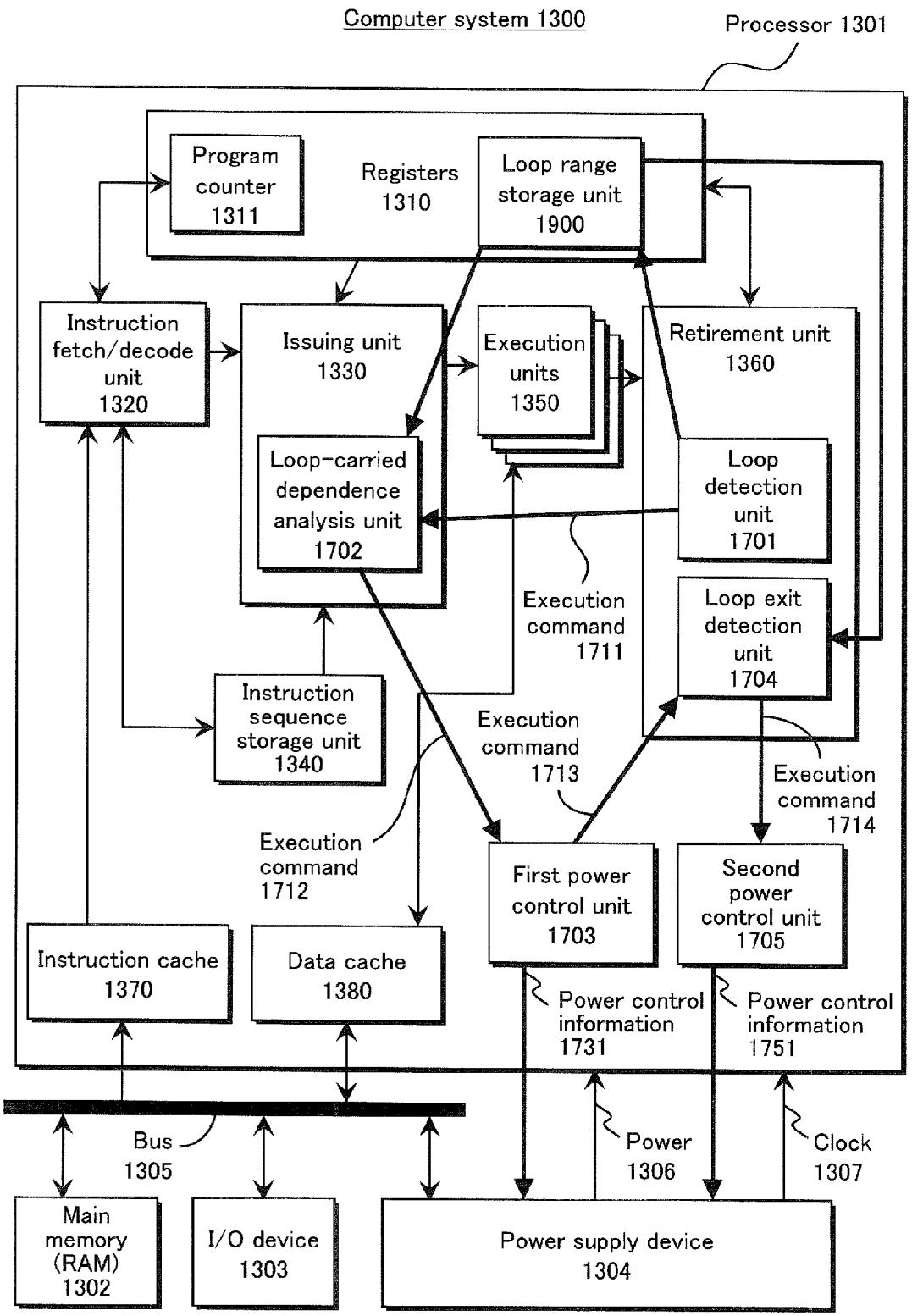
FIG. 1 schematically shows the structure of a computer system 1300 provided with an integrated circuit according to Embodiment 1.

The structure of a computer system provided with an integrated circuit according to Embodiment 1 of the present invention is described with reference to FIG. 1. FIG. 1 is a block diagram schematically showing the structure of a computer system 1300.

The computer system 1300 is provided with a processor 1301, a main memory 1302 (RAM, ROM, or the like), an I/O device 1303 (input/output device), a power supply device 1304, and a bus 1305. Note that the processor 1301 is formed within the integrated circuit.

The processor 1301, the main memory 1302, the I/O device 1303, and the power supply device 1304 are connected to each other by the bus 1305. The power supply device 1304 provides power 1306 and a clock 1307 to the processor 1301.

The power supply device 1304 is provided with a regulator and can change the voltage of the power 1306 provided to the processor 1301. The power supply device 1304 is also provided with a clock generator and a frequency divider in order to change the frequency of the clock 1307 provided to the processor 1301.

The processor 1301 is provided with registers 1310, a program counter 1311 included in the registers 1310, an instruction fetch/decode unit 1320, an issuing unit 1330, an instruction sequence storage unit 1340, execution units 1350, a retirement unit 1360, an instruction cache 1370, and a data cache 1380.

Furthermore, the processor 1301 is provided with a power saving control device (indicated by reference signs 1701-1705 and 1900 in FIG. 1). The power saving control device performs power saving control during execution of a loop for a busy-wait. This power saving control device is described below.

<Basic Operations of Computer System 1300>

Figure 2:
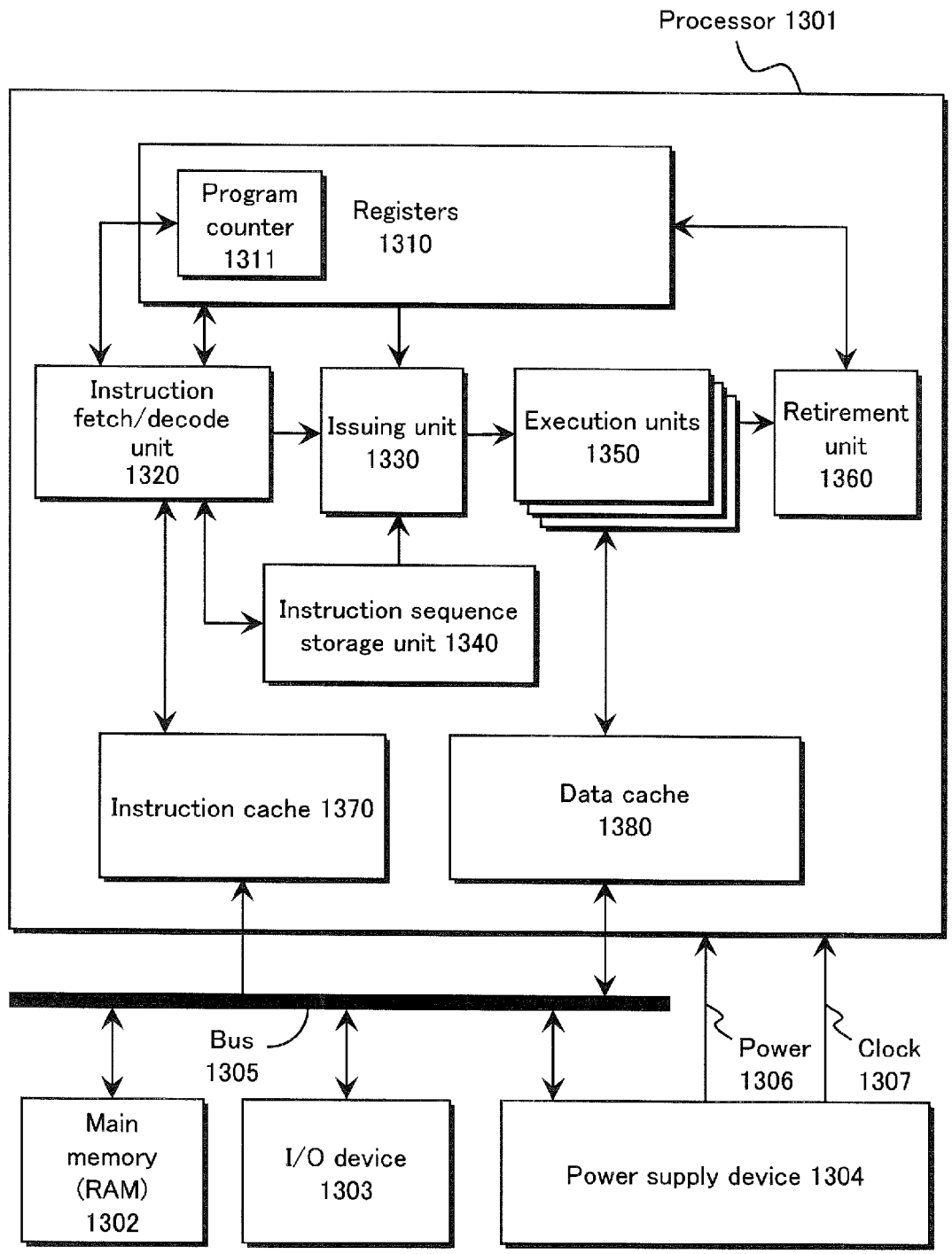
FIG. 2 schematically shows a simplification of the structure of the computer system 1300 provided with the integrated circuit according to Embodiment 1.

FIG. 2 is a simplified view of the computer system 1300, omitting the power saving control device. The basic operations of the computer system 1300 are described with reference to FIG. 2.

First, based on the value of the program counter 1311, the instruction fetch/decode unit 1320 reads an instruction sequence that the processor 1301 might execute from the instruction cache 1370. In other words, the instruction fetch/decode unit 1320 performs a so-called instruction prefetch. Next, the instruction fetch/decode unit 1320 decodes the read instruction sequence and temporarily stores the result in the instruction sequence storage unit 1340.

The instruction sequence storage unit 1340 stores a predetermined number of instructions, overwriting the oldest instruction with a new instruction. In other words, the instruction sequence storage unit 1340 is a ring buffer. Therefore, instructions that have been issued by the issuing unit 1330, which is described next, remain in the instruction sequence storage unit 1340.

The issuing unit 1330 transmits instruction sequences, among the instruction sequences stored in the instruction sequence storage unit 1340, that are ready for execution to the execution units 1350. In other words, the issuing unit 1330 issues instructions. When an instruction for a calculation is issued, for example, the issuing unit 1330 also retrieves the value of each indicated operand (source register) from the registers 1310 and transmits each retrieved value to the execution unit 1350 along with the instruction.

The execution units 1350 perform a variety of processing. This variety of processing includes calculation such as the four arithmetic operations or bit calculation on the values stored in the registers 1310, floating point processing, load/store processing via the data cache 1380 and the bus 1305, branching, and the like. The result of execution of processing by the execution units 1350 is transmitted to the retirement unit 1360.

Note that in the present embodiment, a plurality of execution units 1350 are provided, and instruction sequences are processed in parallel by the plurality of execution units 1350. In this case, the issuing unit 1330 transmits instruction sequences in order to execution units 1350 that are available.

After confirming that preparation for writing to the registers 1310 is complete, the retirement unit 1360 writes the results of execution by the execution units 1350 into the registers 1310. Normally, the retirement unit 1360 writes the results of execution into the registers 1310 in the order of instruction addresses.

The instruction cache 1370 and the data cache 1380 temporarily store information read from the main memory 1302 or information intended for writing into the main memory 1302.

<Instruction Set>

The instruction set of the processor 1301 is described with reference to FIG. 3. FIG. 3 shows instructions 1401 in assembler code included in the instruction set, as well as an outline 1402 and description of calculation 1403 for each instruction 1401.

The instruction set 1400 includes the following instructions: an ADD instruction 1411 for addition; a SUB instruction 1412 for subtraction; a CMP instruction 1413 for comparison; a MOV instruction 1414 for movement; a BNE instruction 1415 for a conditional branch; a JMP instruction 1416 for a jump; an LDR instruction 1417 for reading information from the main memory 1302 or the I/O device 1303, which are connected to the bus 1305, or from the power supply device 1304; an STR instruction 1418 for writing information into the main memory 1302 or the I/O device 1303, which are connected to the bus 1305, or into the power supply device 1304; and an NOP instruction 1419 for incrementing the program counter without performing any calculation.

In the descriptions of calculation 1403, the "<=" symbol indicates assignment.

The register to the left of the assignment symbol, i.e. the register that is the destination of assignment, is referred to as a destination register or a DST register.

The register to the right of the assignment symbol, i.e. the register that is the source of assignment, is referred to as a source register or an SRC register. DST registers and SRC registers are examples of "variables".

<Register Set>

The register set for the processor according to the present embodiment, i.e. the structure of the registers 1310, is now described with reference to FIG. 4.

The register set 1500 includes a general purpose register 1511 for general purpose use during calculation, a program counter (PC) 1512 that indicates the address of the instruction being executed by the processor, and a condition flag register (CFR) 1513 used during determination in a conditional branch or the like.

Note that only portions of the instruction set 1400 and the register set 1500 are shown as examples for the sake of explanation.

When embodying the present invention, a different instruction set and/or register set may be used. For example, the present invention may be embodied using an instruction set such as ARM, MIPS, x86, mn10300, or the like, which are widely used by practitioners of the art.

<Instruction Sequence Storage Unit>

An example of the data structure of an instruction sequence 1600 stored in the instruction sequence storage unit 1340 is described with reference to FIG. 5. In the instruction sequence storage unit 1340, an address 1601, indicating where an instruction is stored, is stored in association with an instruction 1602.

<Power Saving Control Device>

Next, the structure of the power saving control device is described with reference to FIG. 1.

The power saving control device is provided with a loop detection unit 1701, a loop-carried dependence analysis unit 1702, a first power control unit 1703, a loop exit detection unit 1704, and a second power control unit 1705. The power saving control device also includes a loop range storage unit 1900 provided in the registers 1310.

The power saving control device can be roughly divided into two constituent elements. The first constituent element detects the execution state of a busy-wait, performs power saving control, and places the computer system 1300 in a power saving state. The second constituent element detects the end of a busy-wait, terminates the power saving control, and returns the computer system 1300 to its state before the power saving control was performed. The following describes the first constituent element and the second constituent element in this order.

(1) First Constituent Element

The first constituent element is composed of the loop detection unit 1701, the loop-carried dependence analysis unit 1702, and the first power control unit 1703. The loop detection unit 1701 detects execution of a loop, and then the loop-carried dependence analysis unit 1702 determines whether the loop is for a busy-wait or for calculation. In the case of a loop for a busy-wait, the first power control unit 1703 performs power saving control. The following describes operations by the first constituent element with reference to the drawings.

(1-1) Loop Detection Unit

Figure 6:
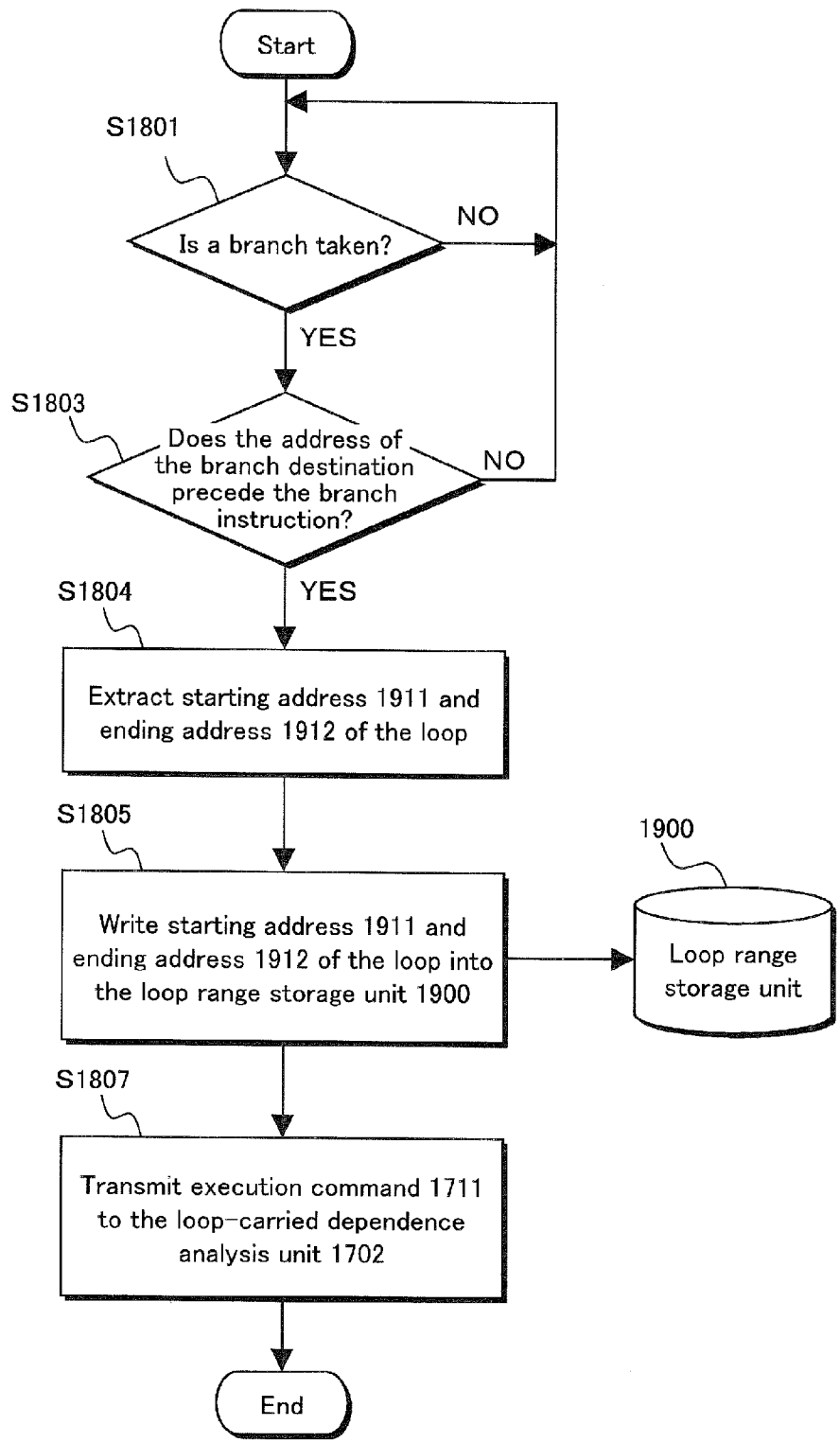
FIG. 6 is a flowchart of processing by a loop detection unit 1701 in Embodiment 1.

Operations by the loop detection unit 1701 are described with reference to the flowchart in FIG. 6.

In step S1801, the loop detection unit 1701 determines whether a branch is taken. If the result of determination in step S1801 is YES (branch taken), processing proceeds to step S1803. If the result of determination in step S1801 is NO (branch not taken), the determination in step S1801 is performed again.

For example, this determination is based on the value of the condition flag register (CFR) 1513 and on the result of execution, transmitted from the execution unit 1350 to the retirement unit 1360, of a jump instruction (JMP instruction 1416) or a conditional branch instruction (BNE instruction 1415). Specifically, the loop detection unit 1701 determines that a branch is taken when the result of execution is to rewrite the value of the program counter 1311 in a predetermined address.

The following explains this determination in detail. The loop detection unit 1701 is provided with a branch instruction storage unit that stores a variety of branch instructions (JMP instruction, BNE instruction, and the like) and an instruction comparison unit that compares an executed instruction, stored in the retirement unit 1360, with the above variety of branch instructions. Upon storage of an executed branch instruction in the retirement unit 1360, the instruction comparison unit detects a branch instruction.

Furthermore, when the branch instruction is a conditional branch instruction, the loop detection unit 1701 refers to the value of the CFR 1513 in the registers 1310. The loop detection unit 1701 determines, for example, that a branch is taken when the value of the CFR 1513 is other than "0", and that a branch is not taken when the value is "0". The value of the CFR 1513 is, for example, a value that has been written by the retirement unit 1360 and that represents the result of execution of a comparison instruction (CMP) preceding a conditional branch instruction.

Next, in step S1803, the loop detection unit 1701 determines whether the address of the branch destination is an address preceding the branch instruction. If the result of determination in step S1803 is YES (address of the branch destination is an address preceding the branch instruction), processing proceeds to step S1804. If the result of determination in step S1803 is NO (address of the branch destination is not an address preceding the branch instruction), processing returns to step S1801. Note that the result of execution that the execution units 1350 transmit to the retirement unit 1360 includes a branch instruction address and a branch destination address. The above determination is made by comparing these two addresses. If the branch destination address precedes the branch instruction (i.e. if the value of the branch destination address is smaller than the branch instruction address), it is determined that a loop is being executed. If the branch destination address and the branch instruction address differ by at least a preset value, i.e. in the case of a loop with a relatively large number of instructions, the chance of the loop being for a busy-wait is extremely low. Therefore, such a loop can be excluded from analysis of dependence. The preset value may, for example, be set to ten.

Next, in step S1804, the loop detection unit 1701 extracts the starting address 1911 and ending address 1912 of the loop.

First, as the starting address 1911 of the loop, the loop detection unit 1701 extracts the address of the branch destination in the branch instruction in which a branch was taken. Next, as the ending address 1912 of the loop, the loop detection unit 1701 extracts the address at which the branch instruction for which the branch was taken is stored.

An example of how the loop detection unit 1701 extracts the starting address 1911 and the ending address 1912 of the loop is now described using the example instruction sequence 1600 shown in FIG. 5. Since the starting address 1911 of the loop is the "address of the branch destination in the branch instruction", the starting address is the "1004" in the branch instruction "BNE 1004", i.e. address 1004. Next, since the ending address 1912 of the loop is the "address at which the branch instruction is stored", the ending address is 1010, where the branch instruction "BNE 1004" is stored.

Subsequently, in step S1805, the loop detection unit 1701 transmits the starting address 1911 and the ending address 1912 of the loop, as extracted in step S1804, to the loop range storage unit 1900. The data structure of the loop range storage unit 1900 is described with reference to FIG. 7. The loop range storage unit 1900 is composed of a register (a type of memory) storing a starting address 1911 and an ending address 1912.

In step S1807, the loop detection unit 1701 then transmits an execution command 1711 to the loop-carried dependence analysis unit 1702 to perform an analysis of dependence. Note that the execution command 1711 is issued, for example, by raising voltage to a high level on a signal line connecting the loop detection unit 1701 and the loop-carried dependence analysis unit 1702.

Note also that as long as the loop detection unit 1701 can detect execution of a loop by the processor, the loop detection unit 1701 may perform processing other than the processing shown here. For example, determination that a loop is being executed may be made when an address stored in the program counter 1311 is reduced upon updating.

(1-2) Loop-Carried Dependence Analysis Unit 1702

The following describes how the loop-carried dependence analysis unit 1702 differentiates between a loop used for a busy-wait and a loop not used for busy-wait (such as a loop for calculation) while listing specific examples of instruction sequences.

(1-2-1) Example of Analysis of a Loop for a Busy-Wait

First, the instruction sequence in FIG. 8 is discussed as an example of an instruction sequence, representing a loop for a busy-wait, that is analyzed by the loop-carried dependence analysis unit 1702.

In the instruction sequence 2100 in FIG. 8, an LDR instruction at address 1008 reads the address indicated by an R2 register into an R0 register. Next, the CMP instruction at address 100*c* compares the value of the R0 register with the value of an R1 register, which has a pre-stored value. If the values match, the loop is exited by a BNE instruction at address 1010. In other words, the loop terminates by the branch not being taken. On the other hand, if the values do not match, the BNE instruction at address 1010 causes processing to branch to address 1004. In other words, the branch is taken.

The instruction sequence 2100 in FIG. 8 is processing to repeatedly read the value at a fixed address (the address indicated by the R2 register) and perform a comparison using the read value. The value stored at the address indicated by the R2 register corresponds to the synchronization variable of a busy-wait.

The instruction sequence 2100 is used, for example, when waiting for key input. In such a case, subsequent processing is performed when a key is pressed (i.e. when the synchronization variable is overwritten). When no key is pressed (i.e. when the synchronization variable is not overwritten), however, the processing for checking on the value of the synchronization variable (at the address indicated by the R2 register) is repeatedly performed, thus wasting power. Accordingly, it is preferable to reduce the amount of power consumed by execution of this sort of loop (instruction sequence 2100).

Next, operations for analysis by the loop-carried dependence analysis unit 1702 are described with reference to the flowchart in FIG. 9 and the instruction sequence 2100 in FIG. 8.

In step S2001, the loop-carried dependence analysis unit 1702 begins analysis upon receiving the execution command 1711 from the loop detection unit 1701.

In step S2003, the loop-carried dependence analysis unit 1702 acquires the starting address 1911 and the ending address 1912 of the loop from the loop range storage unit 1900. Acquisition of the starting address 1911 of the loop and the like is performed similarly to when the issuing unit 1330 acquires a value from a predetermined register. The register of the loop range storage unit 1900 is treated as the indicated register.

In step S2005, the loop-carried dependence analysis unit 1702 acquires an instruction sequence within the loop range from the instruction sequence storage unit 1340. As described above, instructions that have been issued by the issuing unit 1330 remain in the instruction sequence storage unit 1340. Furthermore, the number of instructions stored in the instruction sequence storage unit 1340 is set high enough for an instruction sequence within the loop range to remain in the instruction sequence storage unit 1340 even after detection of a loop.

Note that if an instruction sequence within the loop range is not currently stored in the instruction sequence storage unit 1340, then after execution of a branch instruction, the program counter 1311 may be overwritten with the starting address of the loop. The instruction fetch/decode unit 1320 may then be caused once again to fetch/decode the instruction sequence within the loop range and store the instruction sequence in the instruction sequence storage unit 1340.

In step S2007, the loop-carried dependence analysis unit 1702 stores the acquired instruction sequence 2100 in a dependence analysis buffer 2200 provided in the loop-carried dependence analysis unit 1702.

The data structure of the dependence analysis buffer 2200 is described next with reference to FIG. 10.

Two iterations of the instruction sequence 2100, which constitutes a loop, are stored in the dependence analysis buffer 2200. An entry is provided in the dependence analysis buffer 2200 for each instruction included in the loop. An entry is a memory storing an instruction and information associated with the instruction (referred to below as the "current instruction").

The information stored in each entry of the dependence analysis buffer 2200 includes the following: a mnemonic 2201 for the current instruction, an identifier of the DST register (destination register) 2202 for the current instruction, and an identifier of the SRC register (source register) 2203 for the current instruction. Also included is the following intermediate information used for dependence analysis: an entry number 2204 identifying the position of the current instruction within the dependence analysis buffer 2200, an iteration number 2205 to distinguish whether the current instruction is in an earlier iteration or a later iteration of the loop, an entry number 2206 of a prior instruction on which the current instruction is dependent, and a cross-iteration dependence determination result 2207 regarding dependence of the current instruction on the prior instruction.

In step S2007, information is stored in the dependence analysis buffer 2200. Specifically, the mnemonic 2201, the identifier of the DST register 2202, and the identifier of the SRC register 2203 are stored.

The loop-carried dependence analysis unit 1702 then performs the processing between steps S2009 and S2017 once on each of the entries in the dependence analysis buffer 2200, in order from the first entry to the last entry.

First, in step S2011, the loop-carried dependence analysis unit 1702 assigns an entry number 2204 to the entry. The number used as the entry number 2204 is, for example, "1" for the first entry. The number is subsequently incremented one at a time: "2", "3", "4", "5", "6", "7" and "8".

Note that a different number, symbol, or bit may be used as the entry number as long as the entry numbers uniquely identify the entries in the dependence analysis buffer.

Next, in step S2013, the loop-carried dependence analysis unit 1702 assigns the entry an iteration number 2205 to distinguish between the earlier iteration and the later iteration of the loop.

In this example, the earlier iteration of the loop is indicated by an identifier of "1", and the later iteration by an identifier of "2". Note that the iteration number 2205 may be information other than "1" or "2", as long as the information distinguishes between the earlier iteration and the later iteration of the loop.

Next, in step S2015, the loop-carried dependence analysis unit 1702 writes an entry number 2206 of a prior instruction on which the current instruction is dependent. The prior instruction on which the current instruction is dependent refers to the most recent instruction that used the SRC register of the current instruction as the DST register. Dependence, such as flow dependence, true dependence, a Read after Write (RAW) hazard, and the like, can thus be detected.

Note that in the case of an instruction without an SRC register, no value is written into the entry number 2206. Rather, the initial value of "0" is maintained. Furthermore, when it is inferred that the prior instruction on which the current instruction is dependent is not found within the dependence analysis buffer 2200 but rather is external to the loop, a value not used as an entry number (such as "10") may be written to indicate "external to loop", or the initial value of "0" may be left unchanged.

Note that dependence (such as flow dependence) between instructions with the same iteration number 2205 does not extend between loop iterations with different iteration numbers, nor is such dependence used to determine loop-carried dependence. Accordingly, in step S2015, it suffices to generate information that can be used to determine only loop-carried dependence, without verifying dependence within a loop. Specifically, for each instruction with an iteration number 2205 of "1", it suffices to generate information for determining whether any entry with an iteration number 2205 of "2" depends on the instruction.

In step S2016, the loop-carried dependence analysis unit 1702 checks for loop-carried dependence. Specifically, the loop-carried dependence analysis unit 1702 refers to the entry number 2206 of the prior instruction on which the current instruction is dependent to determine if the iteration number 2205 of the prior instruction is "1" and the iteration number 2205 of the current instruction is "2". If the result of determination is YES, then loop-carried dependence exists. In this case, the loop-carried dependence analysis unit 1702 writes "YES" as the cross-iteration dependence determination result 2207 (specifically writing a value of "1"). If the result of determination is NO, then loop-carried dependence does not exist. In this case, the loop-carried dependence analysis unit 1702 writes "NO" as the cross-iteration dependence determination result 2207 (specifically writing a value of "0").

In step S2017, when the loop is complete for all of the entries, the loop terminates, and processing proceeds to step S2019.

FIG. 10 shows the state of the dependence analysis buffer 2200 immediately before the determination by the loop-carried dependence analysis unit 1702 in step S2019 when the processor 1301 has performed the instruction sequence shown in FIG. 8.

Next, in step S2019, the loop-carried dependence analysis unit 1702 determines whether the cross-iteration dependence determination result 2207 is "YES" for any entry.

If the result of determination is "YES" in step S2019, the loop is not for a busy-wait, and processing proceeds to step S2021. In step S2021, the loop-carried dependence analysis unit 1702 terminates processing without issuing an execution command 1712 to the first power control unit 1703. Accordingly, no power saving control is performed.

On the other hand, if the result of determination is "NO" in step S2019, the loop is for a busy-wait, and processing proceeds to step S2023. In step S2023, the loop-carried dependence analysis unit 1702 issues an execution command 1712 for executing power saving control to the first power control unit 1703 and then terminates processing. Accordingly, power saving control is performed. Note that the execution command 1712 is issued, for example, by raising voltage to a high level on a signal line connecting the loop-carried dependence analysis unit 1702 and the first power control unit 1703.

During the processing by the loop-carried dependence analysis unit 1702, there is no loop-carried dependence for the example in FIG. 10 of information stored in the dependence analysis buffer 2200, and thus the result of determination in step S2019 is "NO". In other words, the cross-iteration dependence determination result 2207 is not "YES" for any of the entry numbers from No. 5 through No. 8. In this case, the loop analyzed for dependence is a loop for a busy-wait and is therefore targeted for power saving control.

In this example, processing thus proceeds to step S2023. As a result, the execution command 1712 is transmitted to the first power control unit 1703.

By performing the above processing, the loop-carried dependence analysis unit 1702 performs the analysis shown in the flowchart in FIG. 9, determining that no loop-carried dependence exists when no source register for an instruction in the later iteration of the loop reads a value that is written by performance of an instruction belonging to the earlier iteration of the loop. In other words, the loop-carried dependence analysis unit 1702 determines that loop-carried dependence exists when a source register for any instruction in the later iteration of the loop reads a value that is written by performance of an instruction belonging to the earlier iteration of the loop.

(1-2-2) Example of Analysis of a Loop Not for a Busy-Wait

Next, the instruction sequence 2600 in FIG. 11 is discussed as an example of an instruction sequence in which the loop-carried dependence analysis unit 1702 detects loop-carried dependence.

In the instruction sequence 2600 in FIG. 11, an ADD instruction at address 2004 adds four to the R2 register and inputs the result into the R2 register. Next, the LDR instruction at address 2008 reads the value at the address indicated by the R2 register into the R0 register. The CMP instruction at address 200*c* then compares the value of the R0 register with the value of the R1 register, which has a pre-stored value. If the values match, the loop is exited by a BNE instruction at address 2010. If the values do not match, the BNE instruction at address 2010 causes processing to branch to address 2004.

Figure 9:
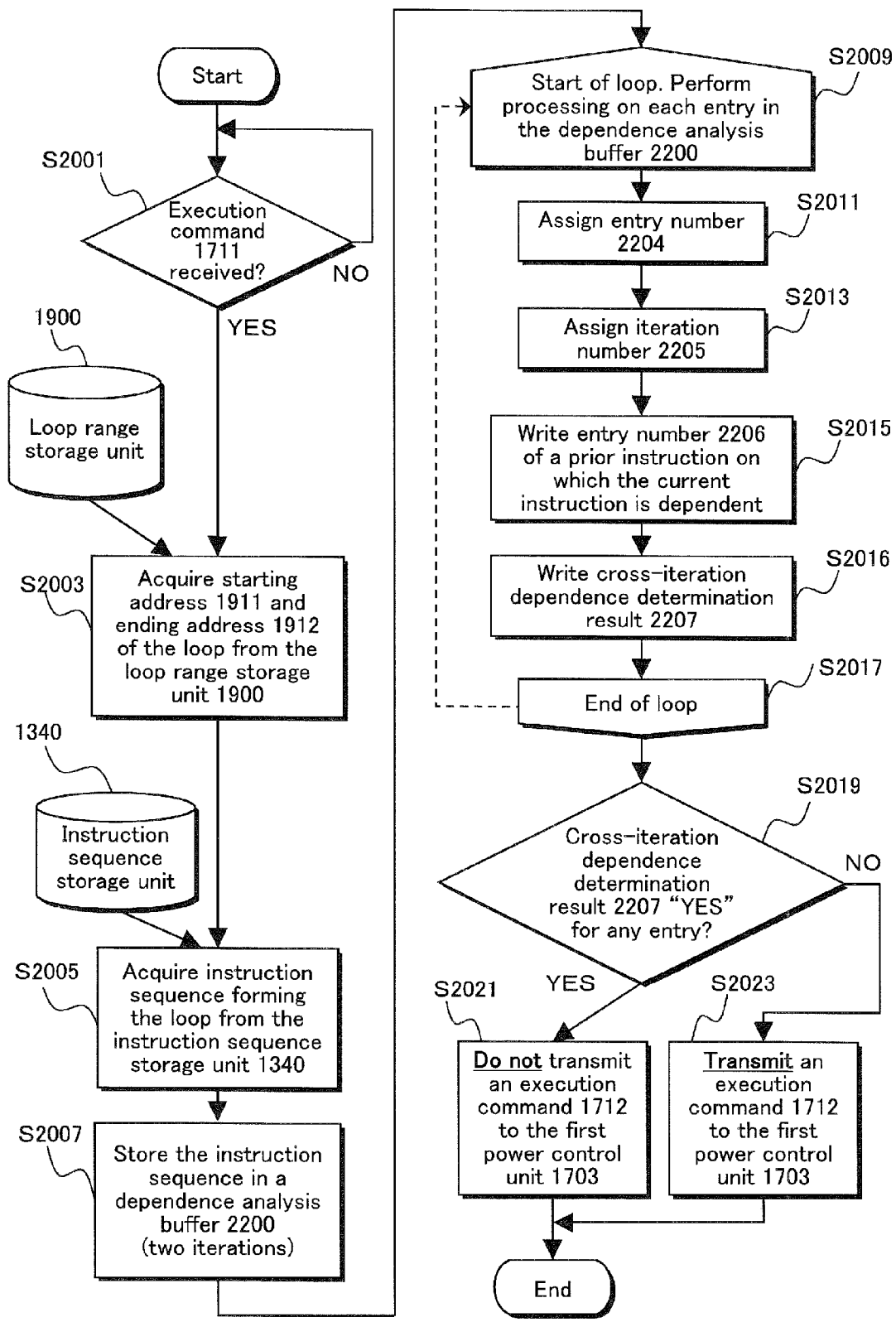
FIG. 9 is a flowchart of processing by a loop-carried dependence analysis unit 1702 in Embodiment 1.

Unlike the instruction sequence 2100 in FIG. 9, the instruction sequence 2600 in FIG. 11 does not repeatedly read and compare values at fixed addresses. This is because the ADD instruction at address 2004 updates the value of the R2 register at every iteration of the loop, so that the value at the address used by the LDR instruction changes every iteration. In other words, the instruction sequence 2600 is for finding an address, among a plurality of addresses, at which the same value as the R1 register is stored. The instruction sequence 2600 is not used in a loop for a busy-wait. This loop should thus not be targeted for power saving control.

Next, FIG. 12 shows the state of a dependence analysis buffer 2700 when the loop-carried dependence analysis unit 1702 has analyzed dependence of the instruction sequence 2600 in FIG. 11. Note that the state of the dependence analysis buffer 2700 is the state immediately before the determination in step S2019.

In the dependence analysis buffer 2700 in FIG. 12, the SRC register 2203 of entry No. 5 is the R2 register. The DST register 2202 of entry No. 1 is the same R2 register. Between entries No. 1 and No. 5, the R2 register is not the DST register 2202 for any other entry. In other words, for the SRC register 2203 for entry No. 5, the cross-iteration dependence determination result 2207 is YES. Accordingly, the result of determination by the loop-carried dependence analysis unit 1702 in step S2019 is YES (i.e. loop-carried dependence exists).

As a result, the execution command 1712 is not transmitted to the first power control unit 1703, and at this point in time, the first power control unit 1703 does not perform power saving control on the processor 1301.

(1-2-3) Summary of Loop-Carried Dependence Analysis

In the above two examples, a loop used for a busy-wait is selected to be detected as the target of power saving control, and a loop not for a busy-wait is not selected.

Accordingly, by using the loop-carried dependence analysis unit 1702, power saving control is performed when a busy-wait loop is being executed. Conversely, when a busy-wait loop is not being executed, power saving control is avoided.

What is of particular note in Embodiment 1 of the present invention is the determination in step S2019 during processing by the loop-carried dependence analysis unit 1702. In step S2019, it is determined whether the source register for an instruction in the later iteration of the loop is not written to by executing an instruction in the earlier iteration of the loop.

Figure 33:
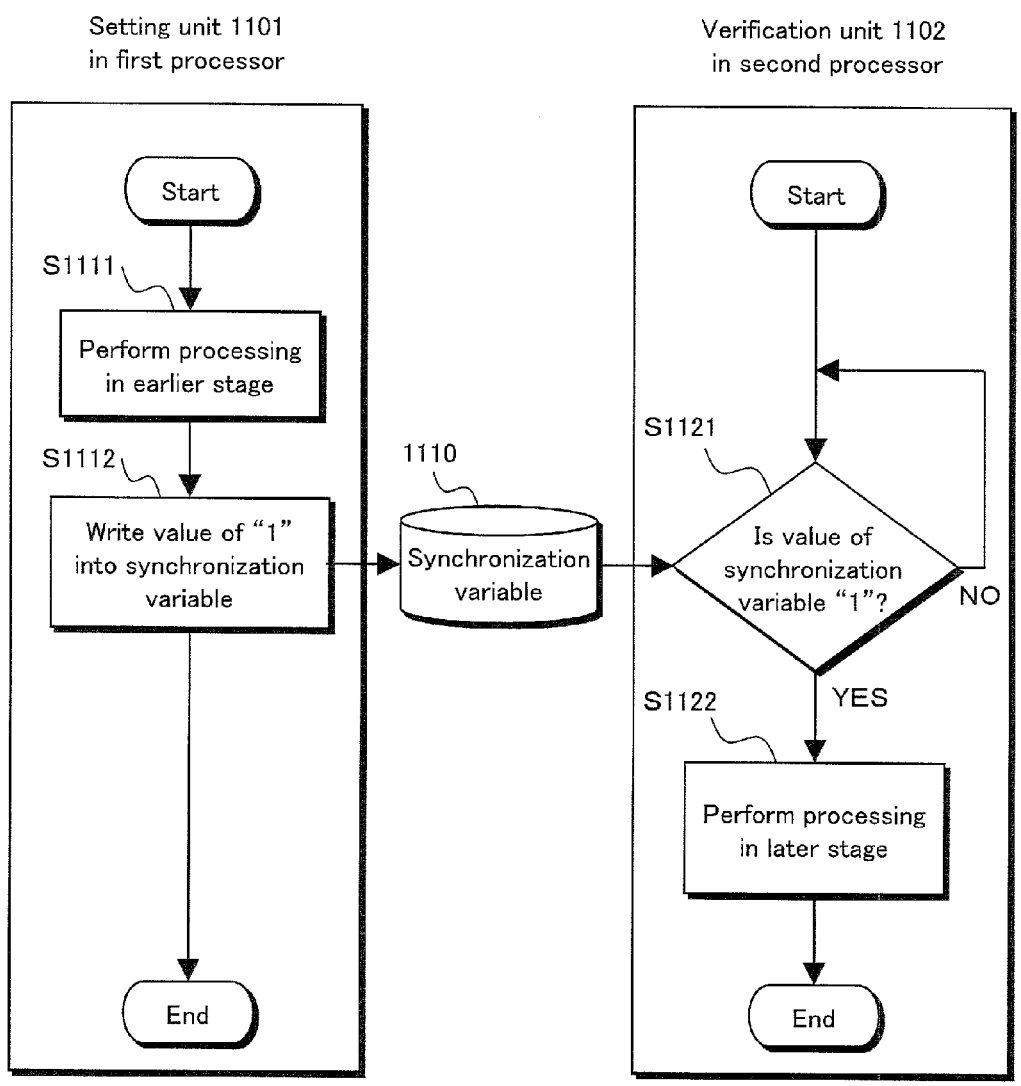
FIG. 33 schematically illustrates an example of a busy-wait, part of the background art for the present invention.
Figure 34:
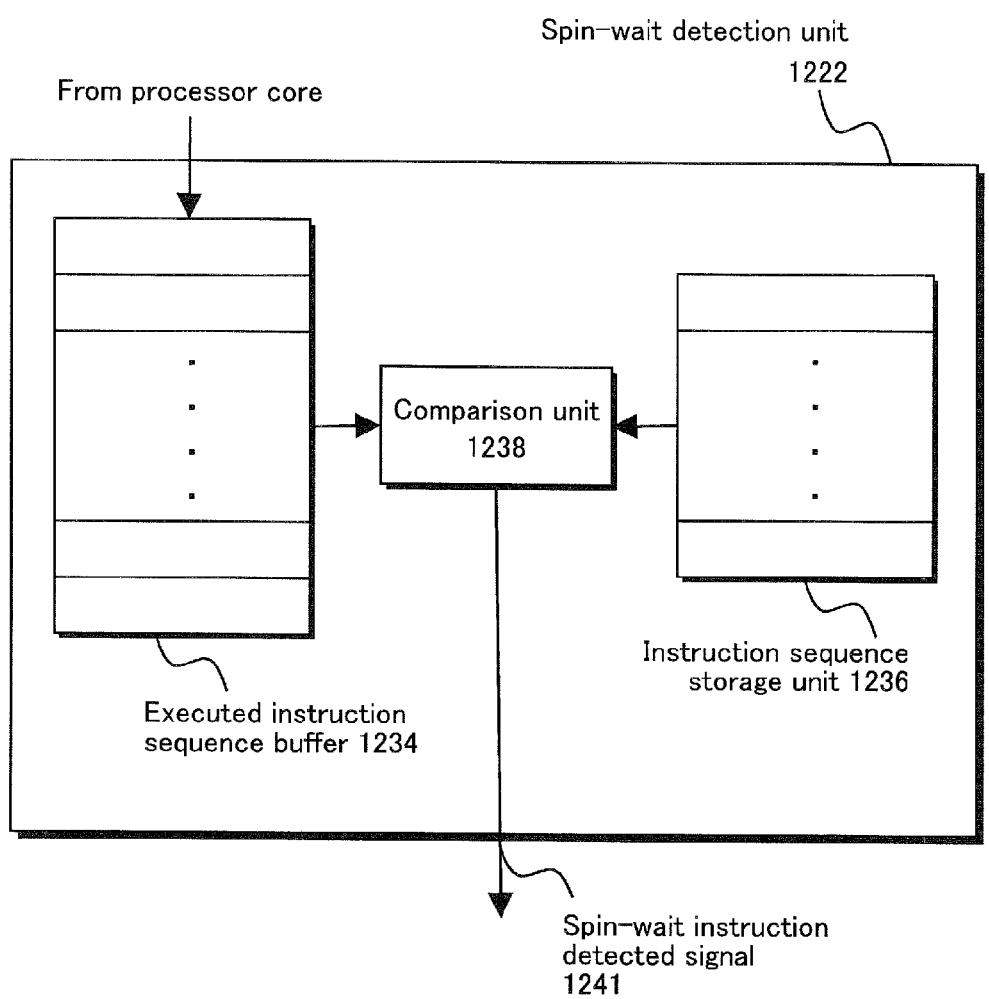
FIG. 34 schematically shows the structure of a spin-wait detection unit in Patent Literature 1.

It is thus determined whether a variable used in the loop is overwritten due to a factor external to the loop. For example, in the case shown in FIG. 33, a variable is overwritten due to a factor external to the loop when the setting unit 1101 in the first processor overwrites the synchronization variable. A busy-wait is characterized in this way by overwriting, due to a factor external to the loop, of the synchronization variable used during a busy-wait. It is thus possible to detect a busy-wait using the above determination method.

For example, the SRC register 2203 for entry No. 6 in FIG. 10 is the R2 register. The value of the R2 register is written into the R0 register and then compared with the value of the R1 register. In this case, the R2 register corresponds to the above synchronization variable. There is no instruction in the loop treating the R2 register as the DST register 2202. Therefore, it is clear that the R2 register, which is a synchronization variable, is not overwritten due to a factor internal to the loop. In other words, it can be determined that the loop is for a busy-wait.

This structure therefore allows for selective detection of a loop for a busy-wait from among a variety of loops executed by the processor. This structure also allows for performance of power saving control to be selected when a loop for a busy-wait is being executed.

Note that in Embodiment 1, an example of processing by the loop-carried dependence analysis unit 1702 is provided in which it is determined whether the SRC register 2203 of an instruction in a subsequent iteration is used as the DST register 2202 of an instruction in a previous iteration. The loop-carried dependence analysis unit 1702, however, may perform any other processing that can detect that the value of variables used in a subsequent iteration are not overwritten by performing instructions in a previous iteration.

The processing in the flowchart in FIG. 9 is only an example to clearly illustrate a procedure for analyzing whether loop-carried dependence exists. A different method than the above procedure may be used to determine the existence of loop-carried dependence (an example is described below). Furthermore, among the pieces of information shown in the dependence analysis buffers 2200 and 2700, at least one of the mnemonic 2201, the entry number 2204, the iteration number 2205, the entry number 2206 of the prior instruction on which the current instruction is dependent, and the like may be omitted.

(1-3) First Power Control Unit 1703

Figure 13:
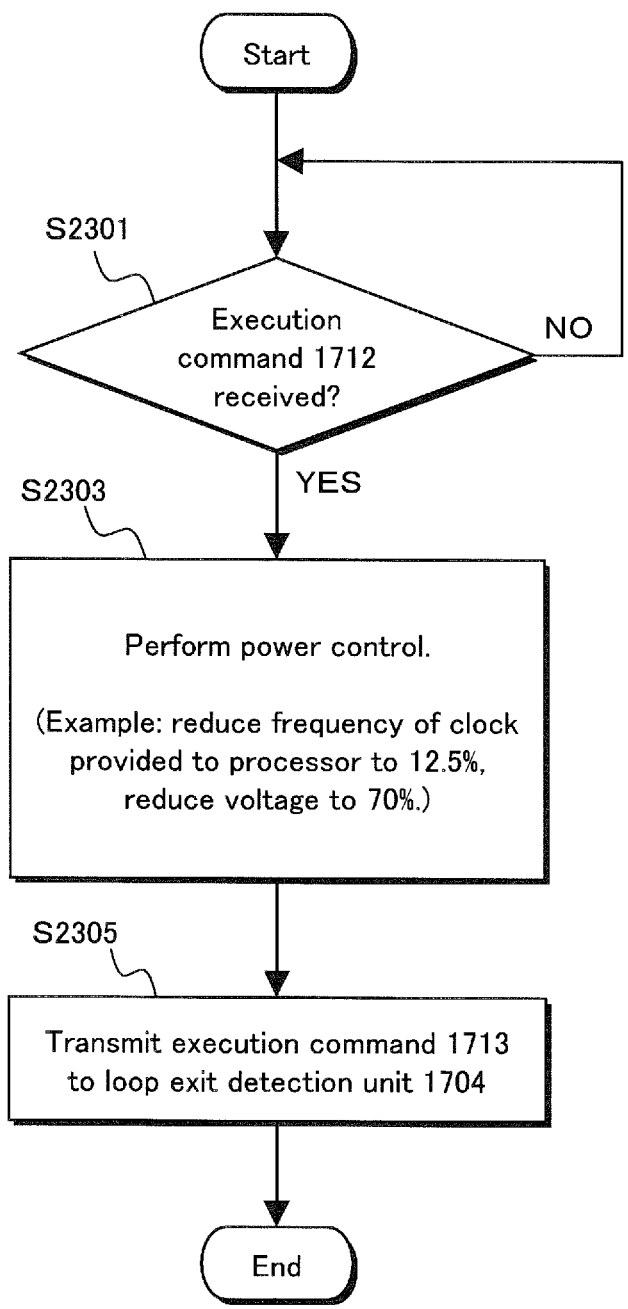
FIG. 13 is a flowchart of processing by a first power control unit 1703 in Embodiment 1.

Next, operations by the first power control unit 1703 are described with reference to the flowchart in FIG. 13.

In step S2301, the first power control unit 1703 waits until receiving the execution command 1712 from the loop-carried dependence analysis unit 1702.

Upon receiving the execution command 1712, the first power control unit 1703 performs power saving control in step S2303. Specifically, the first power control unit 1703 transmits power control information 1731 to the power supply device 1304. The power control information 1731 is for causing the power supply mode of the power supply device 1304 to switch from normal power mode to power saving mode.

A specific example of the power saving control is for the power supply device 1304 to reduce the frequency of the clock 1307 supplied to the processor 1301 and to reduce the voltage of the power 1306 supplied to the processor 1301. For example, the frequency of the clock may be reduced to 12.5% of the maximum frequency, and the voltage may be reduced to 70% of the maximum voltage.

The power supply device 1304 is capable of switching the power supply mode between the normal power mode and the power saving mode. During the normal power mode, the power supply device 1304 causes the clock generator to generate the clock 1307 at a preset frequency (such as the maximum frequency) and supplies the generated clock 1307 to the processor 1301. The power supply device 1304 also supplies the processor 1301 with power 1306 at a preset voltage (such as the maximum voltage).

On the other hand, upon receiving the power control information 1731 from the first power control unit 1703, the power supply device 1304 switches to power saving mode, providing the power 1306 and the clock 1307 respectively with voltage and frequency reduced from the preset value, as in the above example. Note that a plurality of different power saving modes may be provided in order to vary the degree of power saving in accordance with the power saving mode.

In step S2305, the first power control unit 1703 transmits an execution command 1713 for loop exit detection to the loop exit detection unit 1704.

By performing this processing, the first power control unit 1703 can perform power control on the processor 1301 when the loop-carried dependence analysis unit 1702 detects that a busy-wait is being executed.

(2) Second Constituent Element

The following describes the second constituent element of the power saving control device, i.e. the loop exit detection unit 1704 (an example of a loop termination detection unit) and the second power control unit 1705. The loop exit detection unit 1704 detects when the processor 1301 exits from a loop for a busy-wait, and the second power control unit 1705 performs power control to terminate the power saving control.

(2-1) Loop Exit Detection Unit

Figure 14:
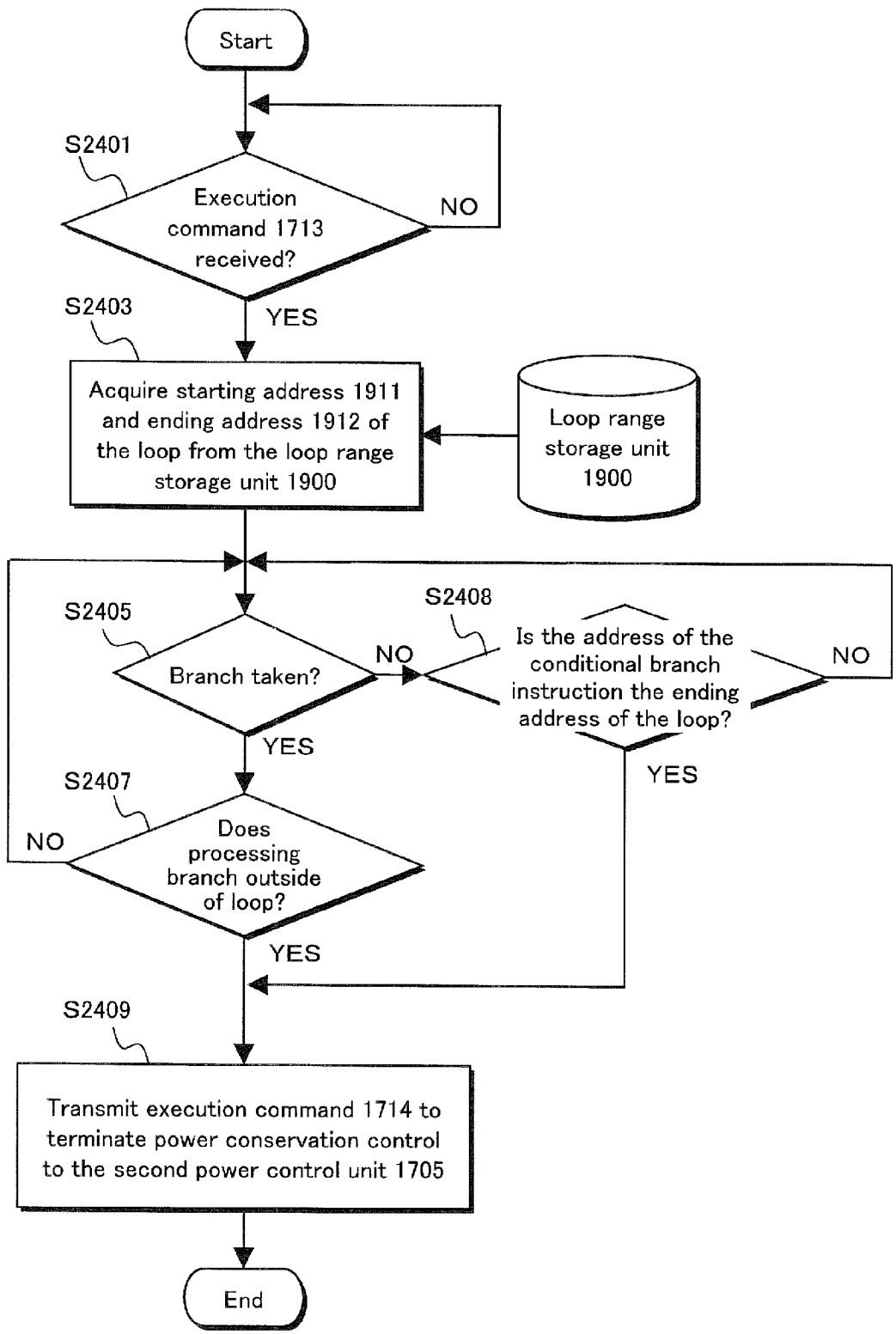
FIG. 14 is a flowchart of processing by a loop exit detection unit 1704 in Embodiment 1.

Operations by the loop exit detection unit 1704 are described with reference to the flowchart in FIG. 14.

First, in step S2401, the loop exit detection unit 1704 waits until receiving the execution command 1713 from the first power control unit 1703.

Upon receiving the execution command 1713, in step S2403 the loop exit detection unit 1704 acquires the starting address 1911 of the loop and the ending address 1912 of the loop from the loop range storage unit 1900. The starting address 1911 and the ending address 1912 are stored in a memory provided in the loop exit detection unit 1704. Note that the starting address 1911 and the ending address 1912 acquired by the loop detection unit 1701 may be stored in the above memory.

Next, in step S2405, the loop exit detection unit 1704 determines whether a branch has been taken based on the result of execution of a branch instruction (and on the value of the condition flag register (CFR)). This determination is the same as the processing by the loop detection unit 1701 in step S1801. Furthermore, like the loop detection unit 1701, the loop exit detection unit 1704 is provided with a branch instruction storage unit and an instruction comparison unit. The loop exit detection unit 1701 and the loop exit detection unit 1704 may share the branch instruction storage unit and the instruction comparison unit.

If the result of determination in step S2405 is YES (branch taken), processing proceeds to step S2407. If the result of determination in step S2405 is NO (branch not taken), processing proceeds to step S2408.

In step S2407, the loop exit detection unit 1704 determines whether processing branches outside of the loop as a result of a conditional branch instruction other than a branch instruction located at the end of the loop. Specifically, the loop exit detection unit 1704 determines whether the address to which processing jumps after the branch taken in step S2405 is outside of the range between the starting address 1911 and the ending address 1912 of the loop as acquired from the loop range storage unit 1900. In other words, if the address after the branch is either smaller than the starting address 1911 or larger than the ending address 1912, the address is determined to be outside of the loop range.

If the result of determination in step S2407 is YES, the loop has terminated. The power saving control should therefore be terminated, so processing proceeds to step S2409. Conversely, if the result of determination is NO, the loop is still in progress. Detection should therefore be continued, so processing returns to step S2405.

In step S2408, the loop exit detection unit 1704 determines whether the result of execution of the conditional branch instruction at the end of the loop is that the branch was not taken. Specifically, it is determined whether the address of the conditional branch instruction is the same as the ending address 1912 of the loop. If the result of determination in step S2408 is YES, the loop has terminated. Processing thus proceeds to step S2409. If the result of determination in step S2408 in NO, the loop is still in progress. Processing thus returns to step S2405.

In order to terminate power saving control, in step S2409 the loop exit detection unit 1704 transmits an execution command 1714 to terminate power saving control to the second power control unit 1705. Note that the execution command 1714 is issued, for example, by raising voltage to a high level on a signal line connecting the loop exit detection unit 1704 and the second power control unit 1705.

In Embodiment 1, the loop exit detection unit 1704 is provided in the retirement unit 1360 and detects whether a loop has terminated based on the result of executing a branch instruction. A different method or device, however, that can detect the termination of a loop may be used. An example of a substitutable method is to detect termination of a loop when the value of the program counter 1311 falls outside of the loop range. In this case, in order to increase stability of detection of loop termination, a loop may be determined to have terminated when, for example, the value of the program counter 1311 becomes larger than the sum of the ending address of the loop and a predetermined value.

(2-2) Second Power Control Unit

Figure 15:
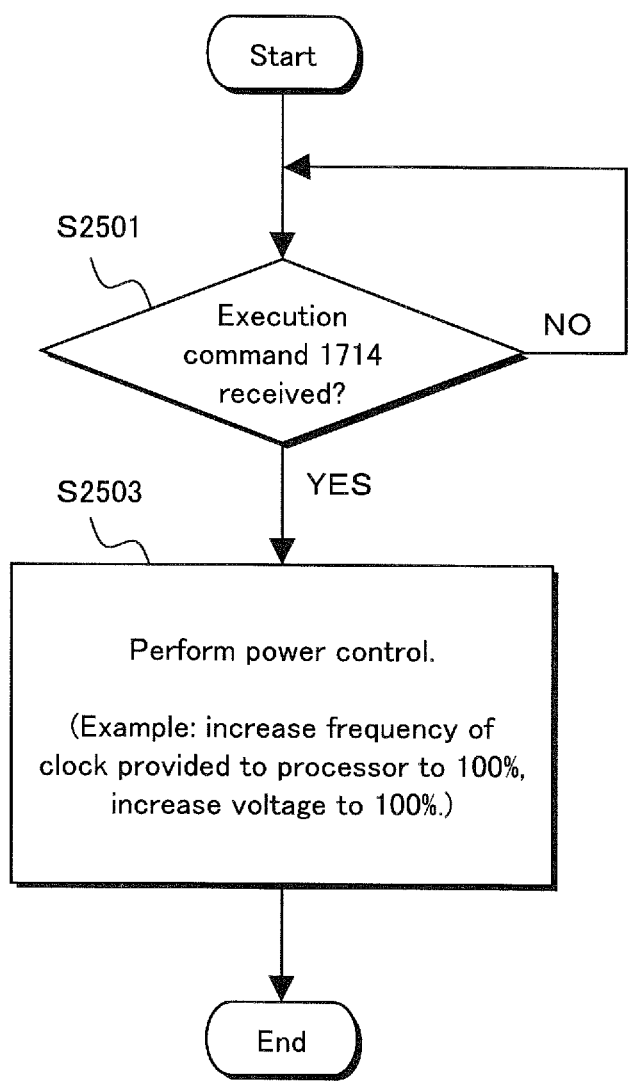
FIG. 15 is a flowchart of processing by a second power control unit 1705 in Embodiment 1.

Next, operations by the second power control unit 1705 are described with reference to the flowchart in FIG. 15.

First, in step S2501, the second power control unit 1705 waits until receiving the execution command 1714 from the loop-carried dependence analysis unit 1702.

Next, upon receiving the execution command 1714, the second power control unit 1705 terminates power saving control in step S2503, returning to normal power control. Specifically, the second power control unit 1705 transmits power control information 1751 to the power supply device 1304. The power control information 1751 is for causing the power supply mode of the power supply device 1304 to return from power saving mode to normal power mode. As a result, the power supply device 1304 increases (or returns to the original value) the frequency of the clock 1307 and the voltage of the power 1306 provided to the processor 1301, for example, which were reduced by the first power control unit 1703.

This concludes the description of the loop detection unit 1701, the loop-carried dependence analysis unit 1702, the first power control unit 1703, the loop exit detection unit 1704, and the second power control unit 1705 that compose the power saving control device in Embodiment 1.

(2-3) In the present embodiment, the first power control unit 1703 and the second power control unit 1705 constitute a "power control unit". The "power control unit" may, however, be constituted by the first power control unit 1703, without including the second power control unit 1705.

<Example of Structure of Loop-Carried Dependence Analysis Unit>

Figure 16:
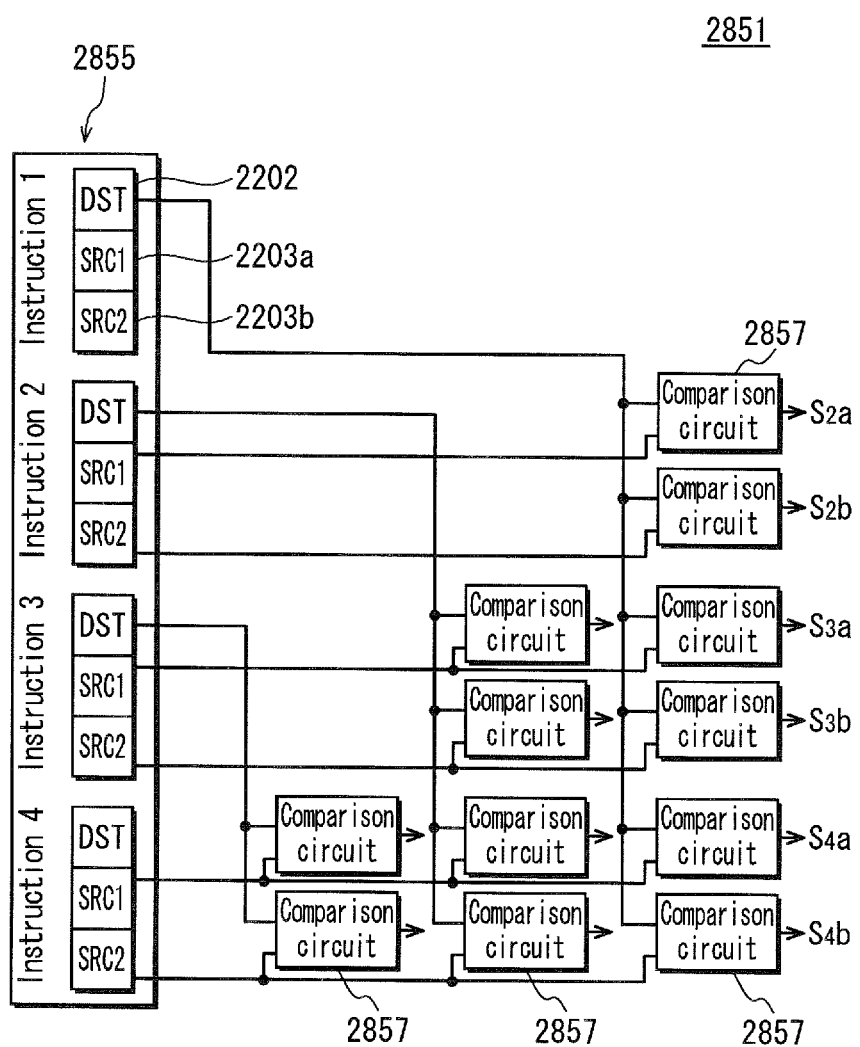
FIG. 16 shows an electronic circuit forming a portion of the loop-carried dependence analysis unit 1702 in Embodiment 1.
Figure 17:
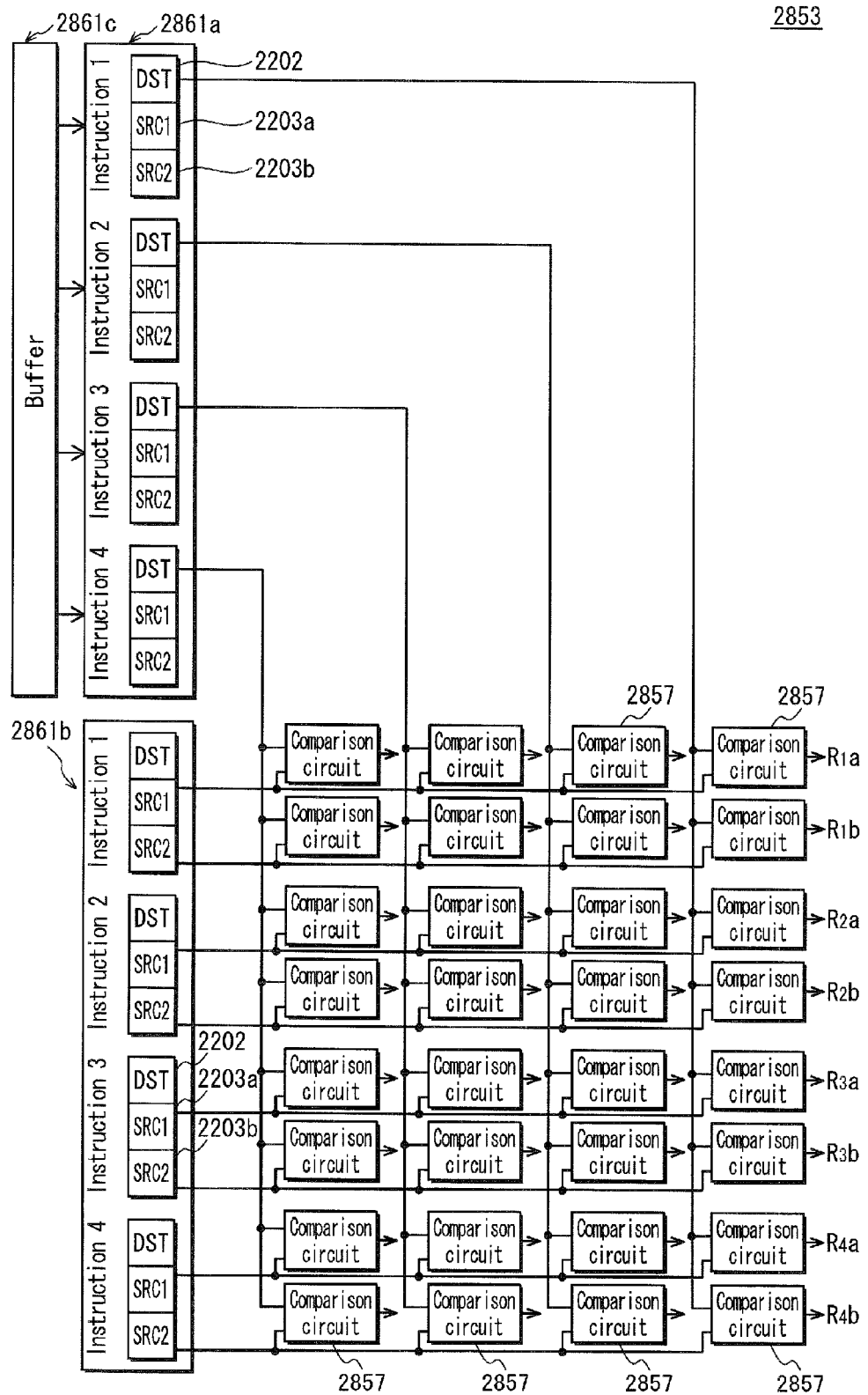
FIG. 17 shows an electronic circuit forming a portion of the loop-carried dependence analysis unit 1702 in Embodiment 1.

The loop-carried dependence analysis unit 1702 may, for example, analyze whether loop-carried dependence exists using a digital electronic circuit as shown in FIGS. 16 and 17.

FIG. 16 shows a flow dependence detection circuit 2851 for detecting flow dependence. FIG. 17 shows a preliminary detection circuit 2853 that, in order to detect loop-carried dependence, detects both preliminary flow dependence as well as loop-carried dependence. Note that while in FIGS. 16 and 17, four examples of instructions in a loop (instructions 1-4) are shown, the circuit may be configured to detect dependence between more than four instructions, such as five or more instructions.

The flow dependence detection circuit 2851 is provided with an instruction buffer 2855 that stores the instruction sequence included in a loop, as well as comparison circuits 2857 that compare the value of the DST register 2202 and the value of the SRC register 2203 between instructions stored in the instruction buffer 2855. The instruction at the uppermost position in the figures is at the beginning of the loop. Note that when two SRC registers 2203a and 2203b are used by one instruction, the value of each of the SRC registers 2203a and 2203b is compared with the value of the DST register 2202.

The instruction buffer 2855 stores an instruction sequence in the loop range received from the instruction sequence storage unit 1340. Note that the instruction sequence storage unit 1340 may be used as the instruction buffer 2855.

Each comparison circuit 2857 outputs "1" when the value of the DST register 2202 and the value of the SRC register 2203 are equivalent and "0" when these values differ. In other words, the comparison circuit 2857 outputs "1" when dependence exists.

One SRC register 2203 may be compared with a plurality of DST registers 2202 (for example, the SRC register 2203 in instruction 4). In this case, if any of the plurality of comparison circuits 2857 outputs a "1", flow dependence is determined to exist ("1"). On the other hand, if all of the plurality of comparison circuits 2857 output "0", flow dependence is determined not to exist ("0").

Among the instructions in the loop, the results of determination for the SRC registers 2203a and 2203b of the $n^{th}$ instruction are referred to as Sna and Snb. For example, the results of determination for the SRC registers 2203a and 2203b of instruction 2 are referred to as S2a and S2b. Since no flow dependence exists in instruction 1, the results of determination are omitted from the figure.

The preliminary detection circuit 2853 shown in FIG. 17 is provided with three instruction buffers 2861a, 2861b, and 2861c that store the instruction sequence included in a loop, as well as comparison circuits 2857 that compare the value of the DST register 2202 and the value of the SRC register 2203 between two of the instruction buffers 2861a and 2861b.

The instruction buffer 2861c stores the instruction sequence in the loop range when the $i^{th}$ iteration of the loop is processed. When the $(i+1)^{th}$ iteration of the loop is executed, the stored instruction sequence is moved to the instruction buffer 2861a. As a result, when the $(i+1)^{th}$ iteration of the loop is executed, the instruction sequence for the loop is stored in two of the instruction buffers, 2861a and 2861b.

The comparison circuits 2857 are the same as the comparison circuits in the flow dependence detection circuit 2851. However, in the preliminary detection circuit 2853, the connections between the DST registers 2202 and the SRC registers 2203 differ from the flow dependence detection circuit 2851. Specifically, a comparison is made for all combinations of the DST registers 2202 in the instruction buffer 2861a, in which the previous iteration instructions are stored, and the SRC registers 2203 in the instruction buffer 2861b, in which the subsequent iteration instructions are stored.

The results of determination for the SRC registers 2203a and 2203b in the instruction buffer 2861b are referred to as Rna and Rnb, similar to the preliminary detection circuit 2853.

If the preliminary detection circuit 2853 determines that dependence exists in any of the SRC registers 2203, and the flow dependence detection circuit 2851 determines that no dependence exists, loop-carried dependence is determined to exist. In other words, loop-carried dependence is detected.

In the example in FIG. 12, the preliminary detection circuit 2853 determines that the SRC register 2203 in entry #5 depends on the DST register 2202 in entry #1. The SRC register 2203 in entry #5 is not flow dependent within the loop. Therefore, the flow dependence detection circuit 2851 detects no dependence. Accordingly, for the SRC register 2203 in entry #5, the result of determination R1a by the preliminary detection circuit 2853 is "1", whereas the result of determination S1a by the flow dependence detection circuit 2851 is "0". In this case, loop-carried dependence is detected. Note that in FIG. 16, as described above, the results of determination for instruction 1, such as S1a, are omitted. Since no flow dependence exists for instruction 1, the results of determination for instruction 1, such as S1a, are "0".

The loop-carried dependence analysis unit 1702 may be constituted by a combination of the preliminary detection circuit 2853 and the flow dependence detection circuit 2851.

While three instruction buffers 2861a, 2861b, and 2861c are provided in the preliminary detection circuit 2853 in FIG. 17, only one may be provided instead. For the instructions stored in the instruction buffer 2861a, only the DST registers 2202 are connected to the comparison circuits 2857. The SRC registers 2203, on the other hand, are not connected to the comparison circuits 2857. Conversely, for the instructions stored in the instruction buffer 2861b, only the SRC registers 2203 are connected to the comparison circuits 2857. The DST registers 2202, on the other hand, are not connected to the comparison circuits 2857. It therefore suffices, for example, to compare all combinations of DST registers 2202 and SRC registers 2203a and 2203b for the instructions stored in the instruction buffer 2861b.

Figure 18:
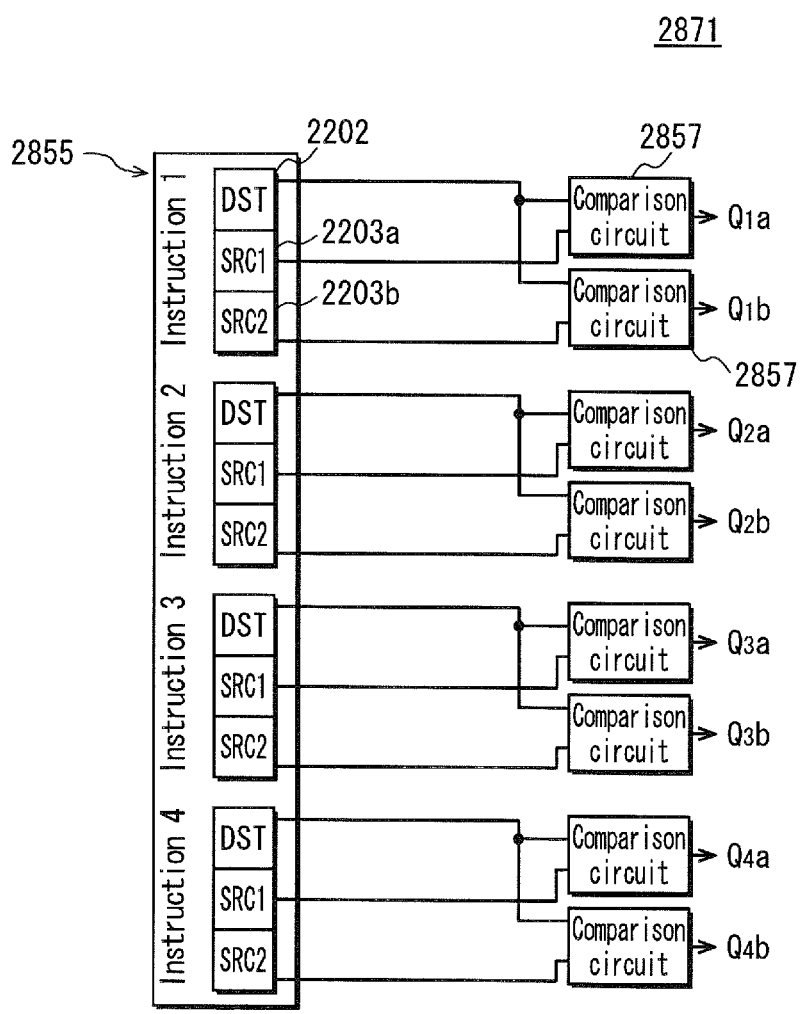
FIG. 18 shows an electronic circuit forming a portion of the loop-carried dependence analysis unit 1702 in Embodiment 1.

Furthermore, FIG. 18 shows a simplified loop-carried dependence detection circuit 2871 for simple detection of loop-carried dependence.

The simplified loop-carried dependence detection circuit 2871 is provided with an instruction buffer 2855 and comparison circuits 2857, like the flow dependence detection circuit 2851. Each comparison circuit 2857 is connected to a DST register 2202 and an SRC register 2203 corresponding to one instruction. In other words, the simplified loop-carried dependence detection circuit 2871 determines whether the DST register 2202 and the SRC register 2203 for an instruction are the same, outputting results of determination Qna and Qnb (in FIG. 18, n is 1-4).

When analyzing the instruction sequence 2600 for the loop shown in FIG. 11, for example, the simplified loop-carried dependence detection circuit 2871 outputs "1" for the result of determination Q1a, since the DST register 2202 and the SRC register 2203 for the ADD instruction at address 2004 are both the R2 register. Loop-carried dependence is thus detected.

The simplified loop-carried dependence detection circuit 2871 thus easily detects loop-carried dependence in a typical calculation loop based on the existence of incremental (or decremental) calculation of the value of a register, which represents a variable.

Examples of the loop-carried dependence analysis unit 1702 using electronic circuits have been described, but the structure of the loop-carried dependence analysis unit 1702 is not limited to these examples. For example, the loop-carried dependence analysis unit 1702 may be constituted by a processor that executes a program to perform the processing shown in FIG. 9. Note that the processor that executes this program may be a simplified processor, such as a microprogram sequencer that executes a microprogram. In this case, the simplified processor may be internal to the processor 1301. Furthermore, the processor executing the above program may be an individual processor in the same integrated circuit as the processor 1301 or may be the processor 1301 itself. Note that loop processes executed by the processor 1301 and by the individual processor that executes the above program may be excluded from detection and dependence analysis.

Furthermore, each constituent element of the power saving control device other than the loop-carried dependence analysis unit 1702 (such as the loop detection unit 1701) may be formed by an electronic circuit or by a processor that executes programs to perform the processing of each constituent element.

In Embodiment 1, the power saving control, as well as the control to terminate power saving control and return to normal power control, may be of a different form than the examples described above. For example, the following forms of control are possible. The power saving control may be performed by reducing the frequency of the clock 1307 provided to the processor 1301 or reducing the voltage of the power 1306 provided to the processor 1301. The control to terminate power saving control and return to normal power control may be performed by increasing the frequency of the clock 1307 provided to the processor 1301 or increasing the voltage of the power 1306 provided to the processor 1301.

[Modification]

<I/O Device>

Figure 19:
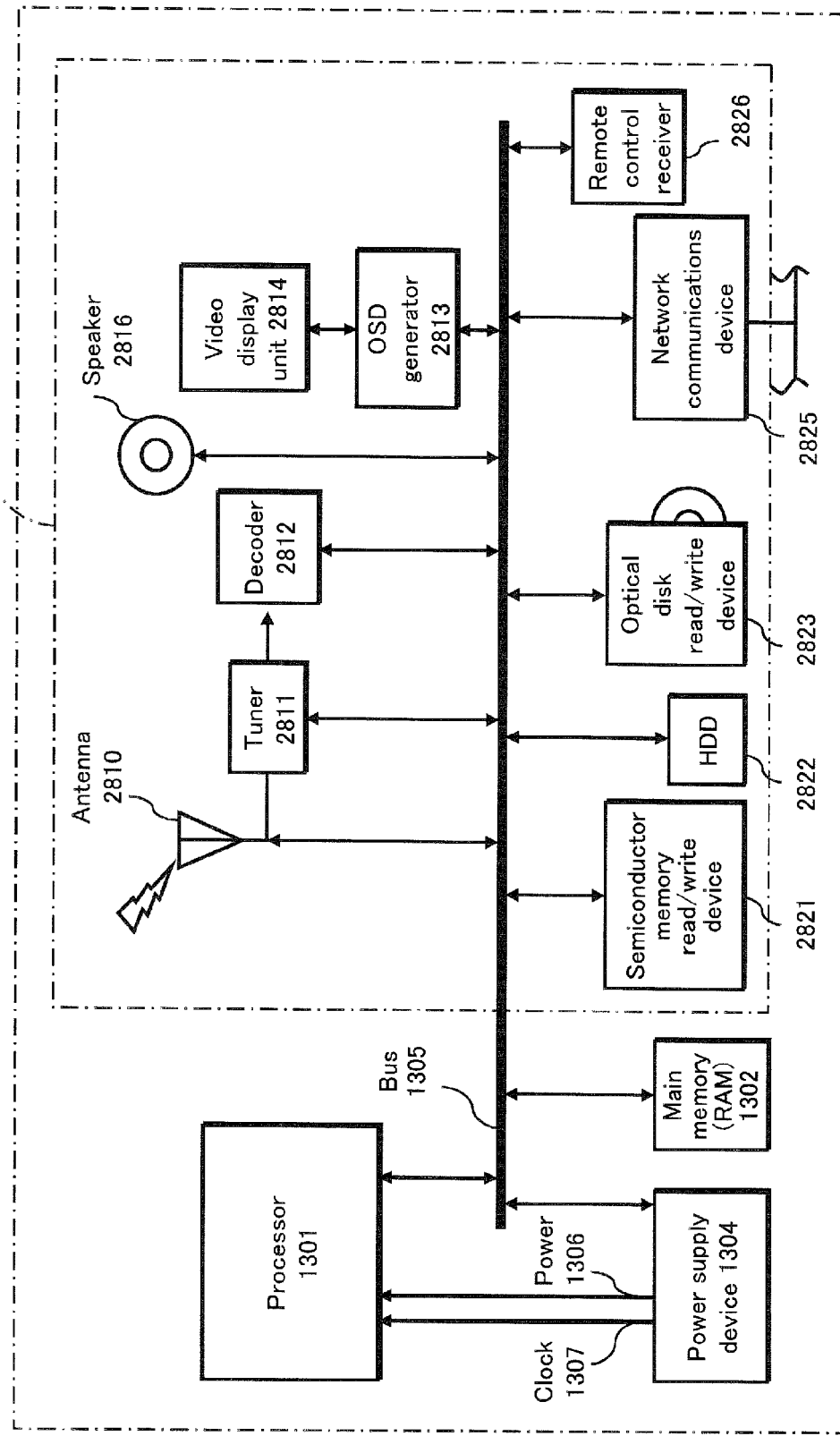
FIG. 19 schematically shows the structure of a computer system 2800 according to a modification.

FIG. 19 shows a modification of the computer system according to Embodiment 1. In FIG. 19, constituent elements that are the same as FIG. 1 are indicated with the same reference signs, and a description thereof is omitted.

In a computer system 2800 shown in FIG. 19, as in FIG. 1, a processor 1301, a main memory 1302, an I/O device group 1303, and a power supply device 1304 are connected to each other by a bus 1305. The power supply device 1304 provides power 1306 and a clock 1307 to the processor 1301.

FIG. 19 shows a specific example of devices that can serve as the I/O device group 1303.

An antenna 2810 is a device for receiving broadcast waves, radio waves of a mobile phone network, or the like.

A tuner 2811 converts the analog radio waves received by the antenna 2810 into a digital signal.

A decoder 2812 decodes the digital signal output by the tuner. Examples of the codec for decoding by the decoder 2812 include MPEG2, MPEG4-AVC, MPEG4-MVC, and the like.

An OSD generator 2813 combines video data decoded by the decoder 2812, screen data generated by the processor 1301, and the like into the form of video data.

A video display unit 2814 displays the video data combined by the OSD generator 2813 on the screen. Examples of the video display unit 2814 include a liquid crystal display, a plasma display, an organic EL display, an LED display, and the like.

A speaker 2816 outputs audio data decoded by the decoder 2812.

A semiconductor memory read/write device 2821, an HDD (hard disk storage device) 2822, and an optical disk read/write device 2823 may be used as storage devices.

A network communications device 2825 receives a network signal from outside of the computer system 2800. Examples of the network communications device 2825 include an Ethernet adapter, a wireless LAN adapter, and the like.

A remote control receiver 2826 receives an infrared external control signal or the like.

Note that the devices described here as forming the I/O device group 1303 may be freely selected for inclusion in the computer system 2800. Furthermore, devices other than those described here may be included. For example, the I/O device group 1303 may include input devices such as a keyboard, a mouse, a touchscreen, and the like.

The computer system 2800 including a portion of these I/O devices may form part of a personal computer, a mainframe, a television, a video deck, an HDD recorder, a mobile phone, a car navigation system, a land-line phone, a copy machine, a network relay device, a mobile terminal with a touchscreen, and the like.

Furthermore, the target of control by the first power control unit 1703 and the second power control unit 1705 is not limited to the voltage of the power 1306 and the frequency of the clock 1307.

The target of control by the first power control unit 1703 and the second power control unit 1705 may be the power provided to the processor 1301 or the computer systems 1300 and 2800.

Embodiment 2

The structure of a computer system 2900 with multithread support in Embodiment 2 is now described with reference to FIG. 20.

Figure 20:
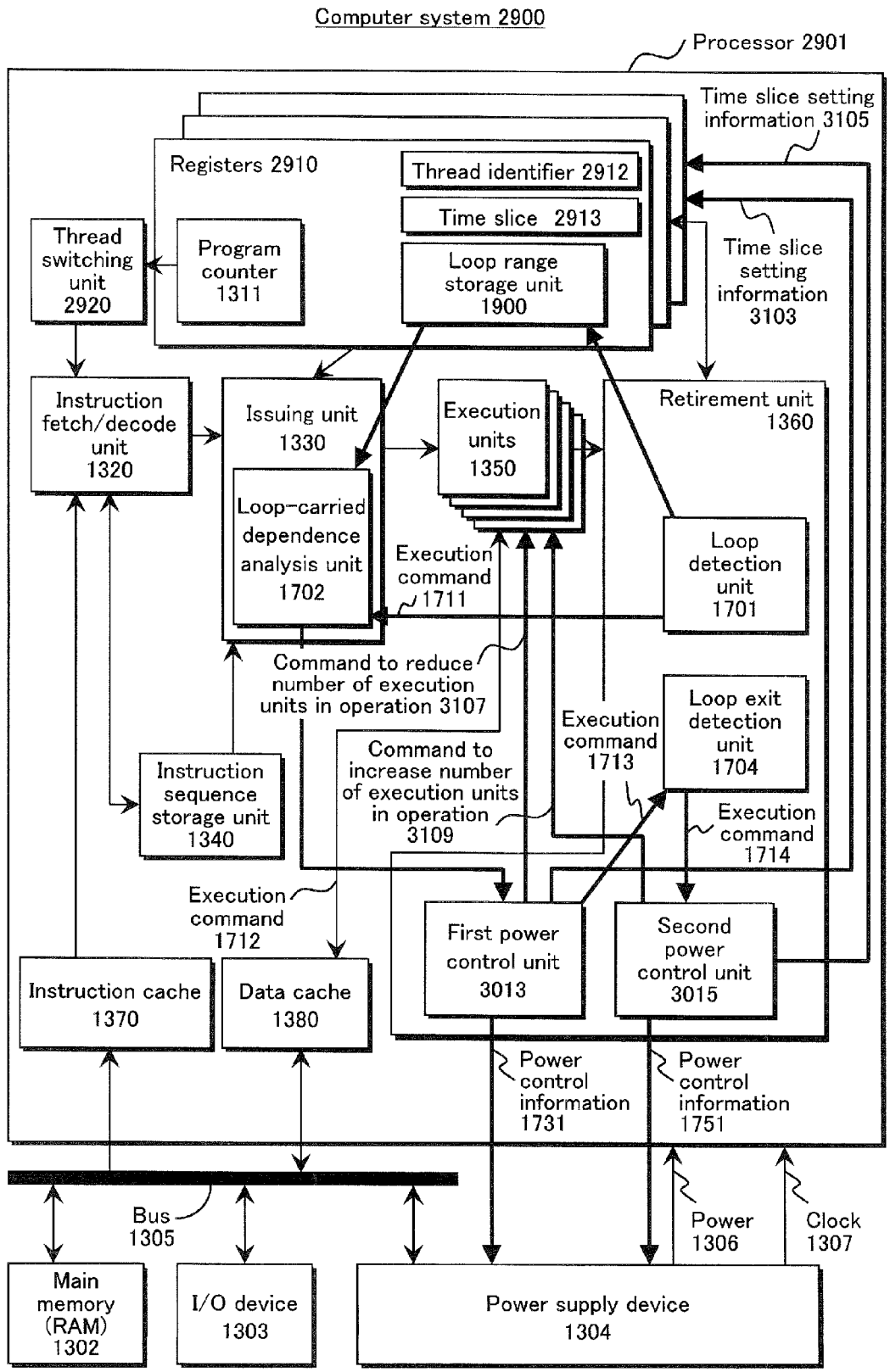
FIG. 20 schematically shows the structure of a computer system 2900 with multithread support in Embodiment 2.

In FIG. 20, constituent elements that are the same as the computer system 1300 in FIG. 1 are indicated with the same reference signs, and a description thereof is omitted.

The computer system 2900 in Embodiment 2 differs from the computer system 1300 in Embodiment 1 in the following points.

(i) The number of registers 2910 in the computer system 2900 equals the number of threads. Each register 2910 is provided with a thread identifier register 2912 and a time slice register 2913.

(ii) The computer system 2900 is provided with a thread switching unit 2920 that switches between threads running in a processor 2901.

(iii) A first power control unit and a second power control unit are provided with a function to output time slice setting information to the registers 2910 and to control the number of execution units 1350 in operation.

<Registers, Thread Switching Unit, and Other>

The data structure of the registers 2910 is now described with reference to FIG. 21.

FIG. 21 shows first registers 2910*a* and second registers 2910*b* respectively corresponding to a first thread and a second thread.

In addition to the constituent elements of the registers 1310 described in FIG. 4, the registers 2910 are each provided with a thread identifier register 2912 and a time slice register 2913.

The thread identifier register 2912 stores a thread identifier for identifying a particular thread among a plurality of threads. For example, "1" is written into the thread identifier register 2912*a* belonging to the first register 2910*a* corresponding to the first thread, and "2" is written into the thread identifier register 2912*b* belonging to the second register 2910*b* corresponding to the second thread.

The time slice register 2913 stores the time allocated to each thread, i.e. the time slice. For example, if clock cycles are allocated at a ratio of 100 each to the first thread and the second thread, "100" is stored in the time slice register 2913*a* of the first register 2910*a* corresponding to the first thread. "100" is also stored in the time slice register 2913*b* of the second register 2910*b* corresponding to the second thread.

The thread switching unit 2920 allocates execution time of the processor 2901 to each thread by time-sharing in response to the value of the time slice register 2913 for each thread.

The following describes an example of the thread switching unit 2920.

The thread switching unit 2920 is connected to the registers 2910 and the instruction fetch/decode unit 1320 either directly or through a bus. The thread switching unit 2920 reads the value of the program counter 1311 for the registers 2910 corresponding to the thread currently being executed. The thread switching unit 2920 then transmits the value to the instruction fetch/decode unit 1320. Along with the value of the program counter 1311, the thread switching unit 2920 also transmits a thread identifier.

For example, if the first thread is being executed, the thread switching unit 2920 transmits the value "1" of the thread identifier and the value of the program counter 1311*a* for the first register 2910*a* to the instruction fetch/decode unit 1320. The program instructions for executing the first thread are thus fetched and decoded.

Note that information in the thread identifier register 2912, i.e. the value of the thread identifier (for example "1") is attached to the instruction sequence fetched by the instruction fetch/decode unit 1320.

In this embodiment, a timer/counter (not shown in the figures) external to the processor 2901 provides notification of the time at which threads are to switch. The following describes an example.

For example, when the first thread starts, the time slice stored in the time slice register 2913*a* is set in the timer/counter, and the timer/counter is started. When the set time slice has passed, the timer/counter notifies the thread switching unit 2920. Having received this notification, the thread switching unit 2920 transmits the values of the registers corresponding to the next thread to the instruction fetch/decode unit 1320. For example, the value "2" of the thread identifier of the second register 2910*b* and the value of the program counter 1311*b* are transmitted.

The address of the instruction fetched by the instruction fetch/decode unit 1320 is thus updated to the address of the program instruction for executing the second thread. As a result, the program instruction for executing the second thread is fetched and decoded, and the thread that is running switches.

The timer/counter is reset after the set time elapses and is started once the time slice for the next thread to be executed, for example the second thread, has been set.

With this structure, the thread that is running is switched in response to the time slices allocated to the threads. Note that the timer/counter may be provided internal to the processor 2901.

In the present embodiment, the time slice register 2913 and the thread switching unit 2920 constitute a "thread management unit". The "thread management unit" may include the thread identifier register 2912.

When issuing an instruction for calculation or the like, the issuing unit 1330 reads the values of the registers, from among the plurality of registers 2910, corresponding to the thread identifier attached to the instruction sequence.

A retirement unit 1360 writes the result of execution by the execution unit 1350 into the registers, among the plurality of registers 2910, corresponding to the thread identifier attached to the instruction sequence.

The loop range storage unit 1900 stores the thread identification in association with the loop range. A loop range and thread identifiers can be stored for a plurality of threads.

Upon detecting a loop, the loop detection unit 1701 writes a thread identifier into the loop range storage unit 1900 along with the loop range.

Along with the loop range, the loop-carried dependence analysis unit 1702 acquires the thread identifier for the thread in which the loop was detected from the loop range storage unit 1900. The loop-carried dependence analysis unit 1702 analyzes the instruction sequence in the loop range of the targeted thread for loop-carried dependence. When no loop-carried dependence exists, the loop-carried dependence analysis unit 1702 transmits an execution command 1712 to the first power control unit 3013. The loop-carried dependence analysis unit 1702 attaches information identifying the thread to the execution command 1712. For example, a plurality of signal lines connecting the loop-carried dependence analysis unit 1702 and the first power control unit 3013 correspond to a plurality of threads. Information identifying the thread is attached by raising the voltage on the signal line corresponding to the thread targeted for analysis.

The loop exit detection unit 1704 receives the thread identifier along with the execution command 1713 from the first power control unit 3013. The loop exit detection unit 1704 acquires a loop range corresponding to the thread identifier from the loop range storage unit 1900. Termination of the loop is detected based on the result of execution of a branch instruction in the thread targeted for analysis.

Note that the loop exit detection unit 1704 can detect termination of a loop for a plurality of threads. When detecting termination of a loop in any thread, the loop exit detection unit 1704 transmits an execution command 1714 along with the thread identifier to the second power control unit 3015.

<Power Control Unit>

The first power control unit 3013 and the second power control unit 3015 are provided in the retirement unit 1360. Processing such as writing to the registers 2910 can thus be easily performed using the functions of the retirement unit 1360.

In addition to the function of transmitting power control information 1731 to a power supply device 1304, the first power control unit 3013 has the functions of transmitting time slice setting information 3103 to the registers 2910 and of transmitting a command 3107 to reduce the number of execution units 1350 in operation.

In addition to the function of transmitting power control information 1751 to the power supply device 1304, the second power control unit 3015 has the functions of transmitting time slice setting information 3105 to the registers 2910 and of transmitting a command 3109 to increase the number of execution units 1350 in operation.

(1) Power Saving Control 1

Figure 22:
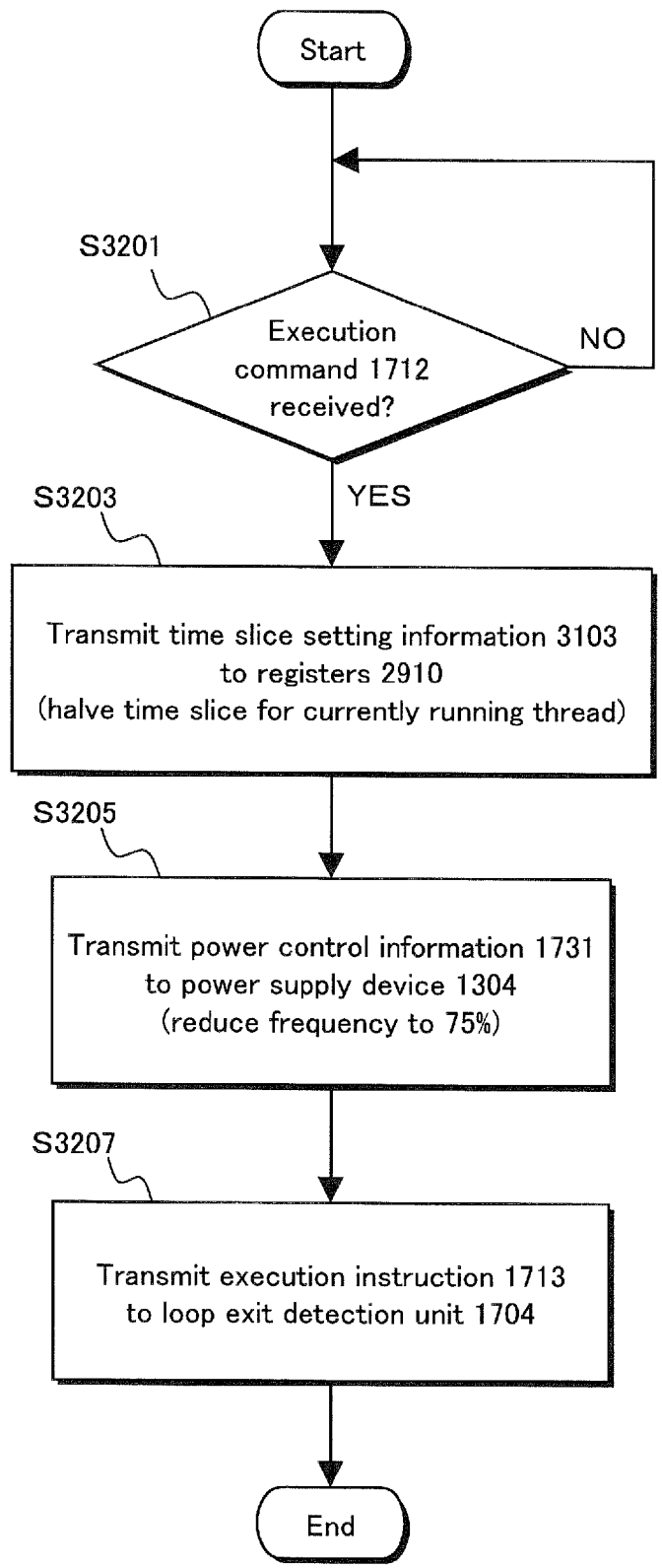
FIG. 22 is a flowchart of processing by a first power control unit 3013 in Embodiment 2.

FIG. 22 shows a flowchart of operations by the first power control unit 3013.

First, in step S3201, the first power control unit 3013 determines whether it has received the execution command 1712 from the loop-carried dependence analysis unit 1702. If the result of determination is YES, processing proceeds to step S3203. If the result of determination is NO, the determination in step S3201 is repeated. Note that as described above, the execution command 1712 includes information for identifying the thread.

Next, in step S3203, the first power control unit 3013 transmits time slice setting information 3103 to the registers, among the plurality of registers 2910, corresponding to the thread indicated by the execution command 1712 (i.e. to the registers 2910 corresponding to the currently running thread). The time slice setting information 3103 represents a reduction in the time slice for the thread, so that the time slice after the change is smaller than the time slice before the change.

For example, if the indicated thread identifier is "2", the first power control unit 3013 changes the value of the time slice register 2913*b* of the second register 2910*b*, whose thread identifier register 2912 is "2", from "100" to "50".

In step S3205, the first power control unit 3013 transmits power control information 1731 to the power supply device 1304. For example, the power control information 1731 indicates to reduce the frequency of the clock 1307 to ¾ the current frequency.

In step S3207, the first power control unit 3013 transmits an execution command 1713 to the loop exit detection unit 1704 along with the indicated thread identifier.

Figure 23:
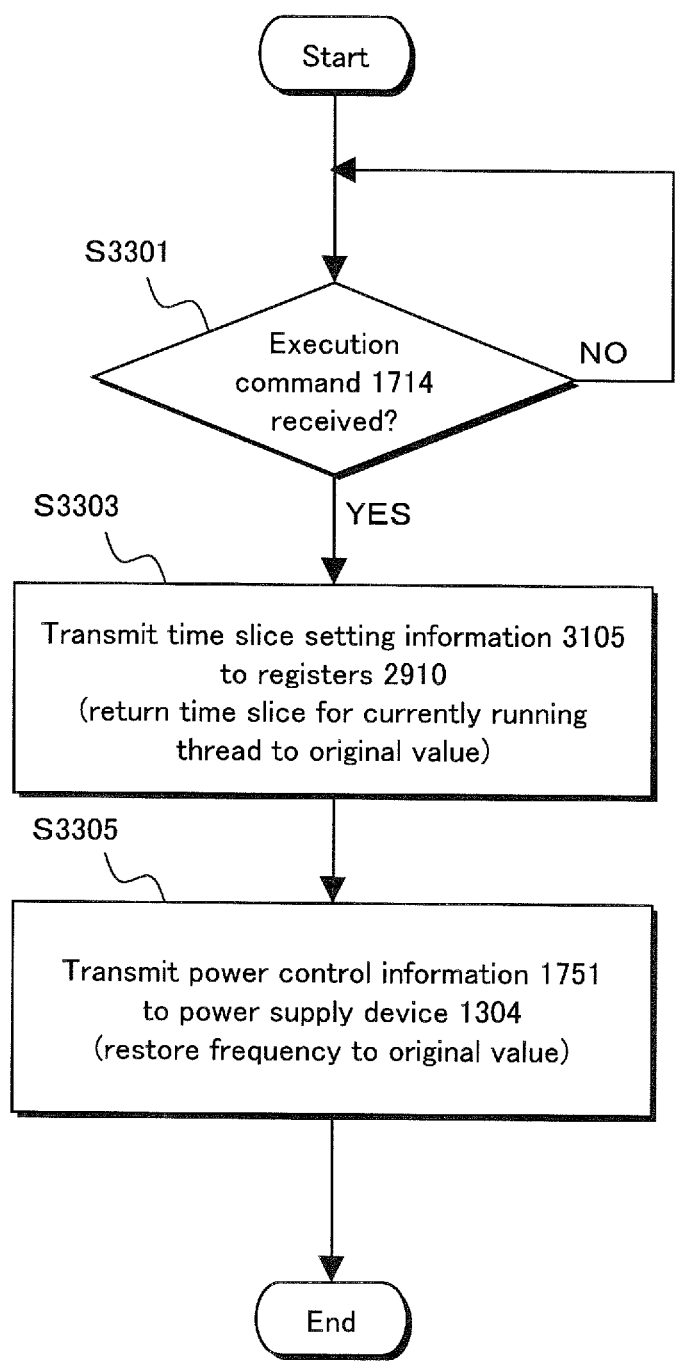
FIG. 23 is a flowchart of processing by a second power control unit 3015 in Embodiment 2.

FIG. 23 shows a flowchart of operations by the second power control unit 3015.

First, in step S3301, the second power control unit 3015 determines whether it has received the execution command 1714 from the loop exit detection unit 1704. If the result of determination is YES, processing proceeds to step S3303. If the result of determination is NO, step S3301 is repeated. Note that as described above, the execution command 1714 includes the thread identifier.

Next, in step S3303, the second power control unit 3015 transmits time slice setting information 3105 to the registers 2910 corresponding to the thread indicated by the thread identifier (i.e. to the registers 2910 corresponding to the currently running thread). The time slice setting information 3105 represents an increase in the time slice for the thread so that the time slice after the change is greater than the time slice before the change (such as by returning to the time slice before reduction by the first power control unit 3013).

For example, if the thread identifier is "2", the second power control unit 3015 returns the value of the time slice register 2913*b* of the second register 2910*b*, among the plurality of registers 2910, from "50" to "100" since the thread identifier register 2912 of the second register 2910*b* is "2".

Next, in step S3305, the second power control unit 3015 transmits power control information 1751 to the power supply device 1304. As a result, the power supply device 1304 increases (or returns to the original value) the frequency of the clock 1307 provided to the processor 2901, for example, which was reduced by the first power control unit 3013.

The following is a consideration of processor resources (processing capability) allocated to a thread in a busy-wait (in the above example, the second thread) and to a thread not in a busy-wait, i.e. to a thread performing regular processing (in the above example, the first thread) during power saving control.

The processor resources allocated to each thread are generally represented by the formula "time slice for a thread÷sum of time slices for all threads×frequency of clock 1307".

In the example described here, the frequency of the clock during power saving control is reduced to ¾ the frequency during normal power control for both the first thread and the second thread.

On the other hand, during power saving control, the "time slice for a thread÷sum of time slices for all threads" increases for the first thread to 4/3 the value during normal power control (from 100÷200 to 100÷150) At the same time, this value decreases for the second thread to ⅔ the value during normal power control (from 100÷200 to 50÷150).

Therefore, in this example, the processor resources allocated to the first thread, which is not in a busy-wait, can be represented as "1", the product of the reduction rate of the frequency of the clock 1307, i.e. ¾, and the increase rate of the allocation ratio of the time slice, i.e. 4/3. In other words, even during power saving control, the processor resources allocated to the first thread are not reduced.

Conversely, the processor resources allocated to the second thread are halved, thus reducing the amount of power wasted.

With this structure, the processing speed of a thread that is not performing a busy-wait is maintained, while processor resources allocated to a thread in a busy-wait are selected for reduction. The power wasted by the processor 2901 executing the busy-wait can thus be reduced, as can the power wasted by the computer system 2900.

The above power saving control can also be considered as follows.

In the above example, the processor resources corresponding to the reduction in the time slice allocated to the thread in a busy-wait are "50÷200×frequency f", as per the above formula. In other words, the reduction in the time slice corresponds to ¼ of the processing resources during normal power control.

Therefore, if the frequency of the clock 1307 is reduced by ¼ in response to the above "¼ of the processing resources", the power consumption of the processor 2901 can be reduced without reducing the processor resources for the thread that is not in a busy-wait. Furthermore, when a particular thread in a busy-wait exits the busy-wait, the processor resources allocated to the particular thread can be increased without decreasing the processor resources allocated to other threads.

In this way, the above power saving control reduces the frequency of the clock 1307 in response to the reduction in the time slice allocated to a thread in a busy-wait.

(2) Power Saving Control 2

In the above example, the computer system 2900 performs power saving control by the first power control unit 3013 and the second power control unit 3015 controlling the frequency of the clock 1307, in order to control power wasted by the computer system 2900.

Other methods of performing power saving control, however, also exist.

For example, instead of controlling the frequency of the clock 1307, or in addition to controlling the frequency, power saving control may be performed by reducing the number of execution units 1350 in operation.

The following describes a flowchart for processing by the first power control unit 3013 and the second power control unit 3015 to perform power saving control by reducing the number of execution units 1350 in operation.

Figure 24:
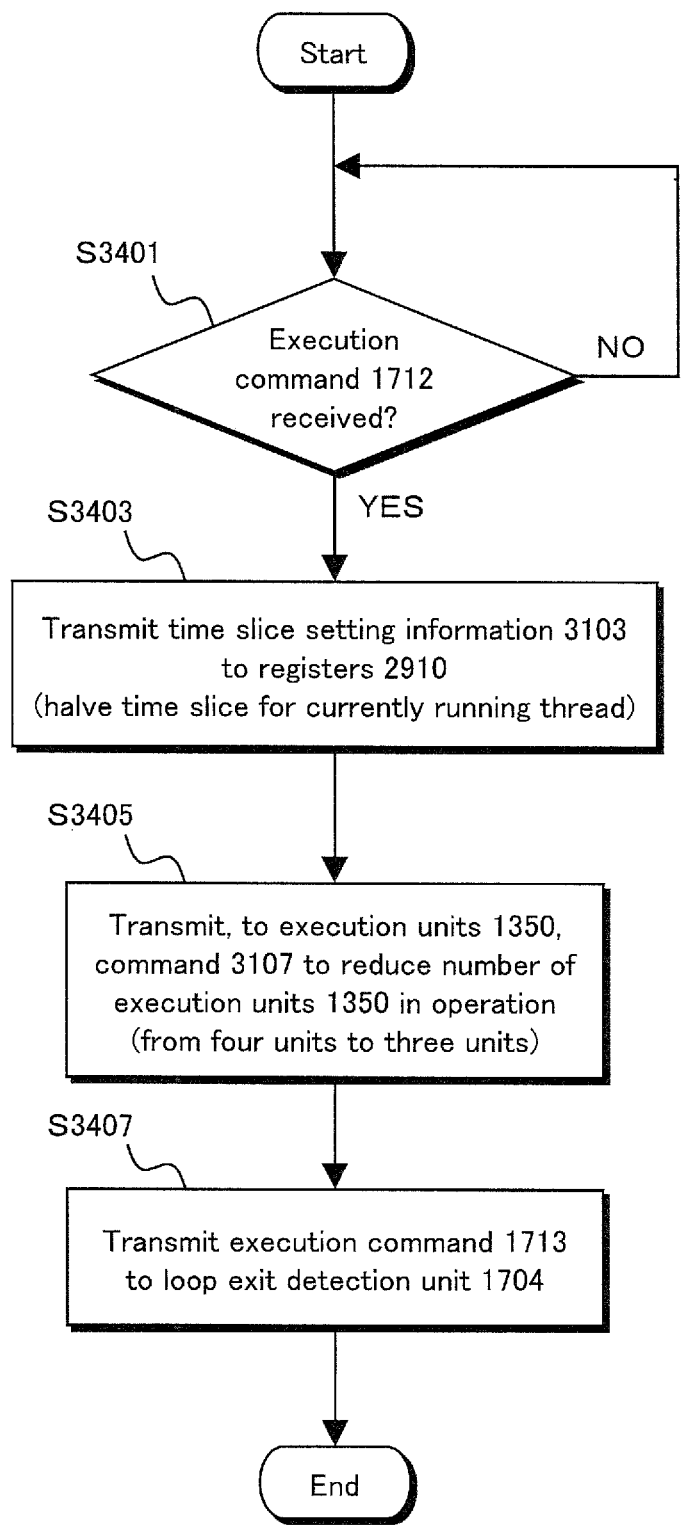
FIG. 24 is a flowchart of processing by the first power control unit 3013 in Embodiment 2.

First, processing by the first power control unit 3013 is described with reference to the flowchart in FIG. 24.

In step S3401, the first power control unit 3013 first determines whether it has received the execution command 1712 from the loop-carried dependence analysis unit 1702. If the result of determination is YES, processing proceeds to step S3403. If the result of determination is NO, processing returns to step S3401. Note that as described above, the execution command 1712 includes information for identifying the thread.

Next, in step S3403, the first power control unit 3013 transmits time slice setting information 3103 to the registers, among the registers 2910, corresponding to the thread indicated by the execution command 1712 (i.e. to the registers 2910 corresponding to the currently running thread). For example, if the thread identifier of the currently running thread is "2", the first power control unit 3013 changes the value of the time slice register 2913b of the second register 2910b, whose thread identifier register 2912 is "2", from "100" to "50".

Next, in step S3405, the first power control unit 3013 transmits, to the execution units 1350, a command 3107 to reduce the number of execution units 1350 in operation. For example, if the number of execution units 1350 in operation is currently four, the first power control unit 3013 instructs the execution units 1350 to reduce the number to three.

The following describes the command 3107 to reduce the number of execution units 1350 in operation.

The first power control unit 3013 is connected to the issuing unit 1330 by a signal line that is omitted from the figures. The first power control unit 3013 instructs the issuing unit 1330 to stop issuing commands to a portion of the plurality of execution units 1350. The first power control unit 3013 transmits this instruction as, for example, a signal on the signal line that, among the signal lines corresponding to the plurality of execution units 1350, corresponds to the execution unit 1350 to be stopped. Issuing of commands to a portion of the execution units 1350 is thus stopped.

An electronic switch, formed by a transistor, is provided on a feed line for supplying power to each execution unit 1350. By turning off the electronic switch corresponding to the execution unit 1350 whose operation is to be stopped, the first power control unit 3013 can cut off power supply to the execution unit 1350, thereby reducing the number of execution units 1350 in operation. Note that the power supply to the execution unit 1350 is cut off after instructing the issuing unit 1330 to stop issuing commands.

In step S3407, the first power control unit 3013 transmits an execution command 1713 to the loop exit detection unit 1704.

Figure 25:
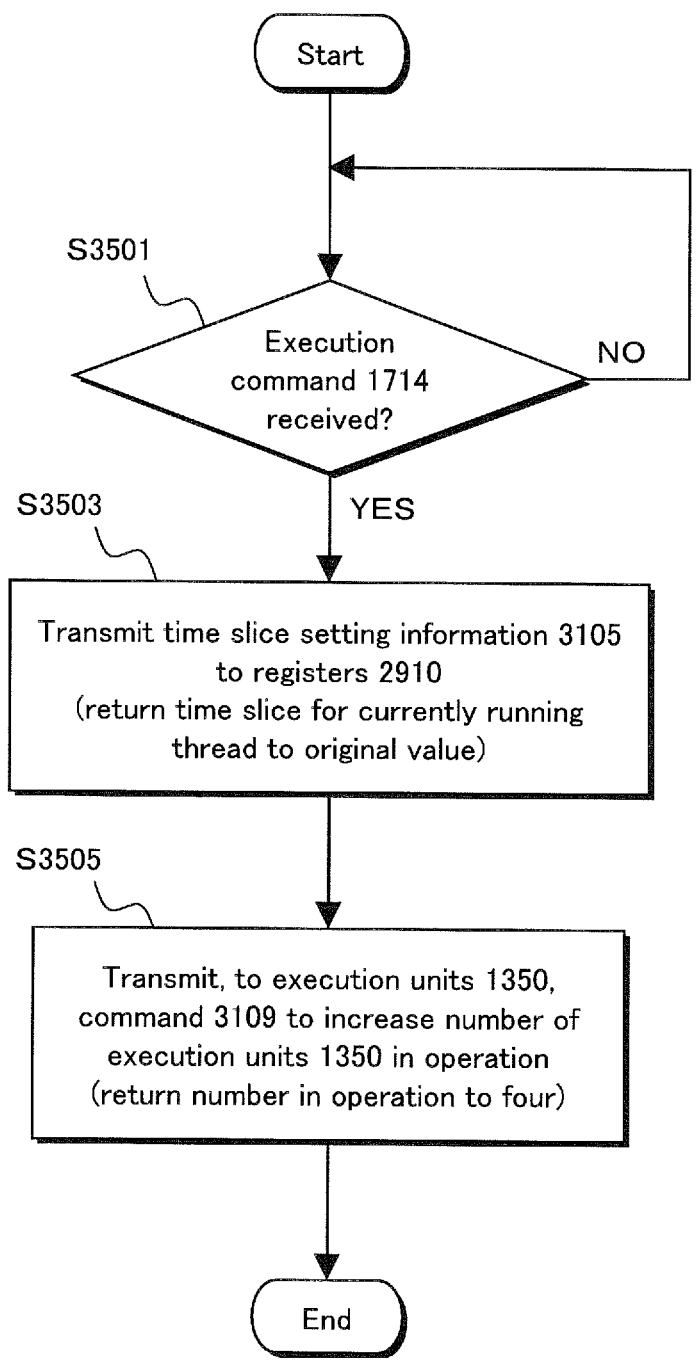
FIG. 25 is a flowchart of processing by the second power control unit 3015 in Embodiment 2.

Processing by the second power control unit 3015 is now described with reference to the flowchart in FIG. 25.

First, in step S3501, the second power control unit 3015 determines whether it has received the execution command 1714 from the loop exit detection unit 1704. If the result of determination is YES, processing proceeds to step S3503. If the result of determination is NO, step S3501 is repeated. Note that as described above, the execution command 1714 includes the thread identifier.

Next, in step S3503, the second power control unit 3015 transmits time slice setting information 3105 to the registers 2910 corresponding to the thread indicated by the thread identifier (i.e. to the registers 2910 corresponding to the currently running thread). For example, if the thread identifier is "2", the second power control unit 3015 returns the value of the time slice register 2913b of the second register 2910b, whose thread identifier register 2912 is "2", from "50" to "100".

Next, in step S3505, the second power control unit 3015 transmits, to the execution units 1350, a command 3109 to increase the number of execution units 1350 in operation. For example, the command 3109 indicates that the number of execution units 1350 in operation is to be returned to four, i.e. the number before reduction by the first power control unit 3013. The command 3109 to increase the number of execution units 1350 in operation is executed in the reverse order as the command 3107 to reduce the number of execution units 1350 in operation. Specifically, after the electronic switch is turned on, the issuing unit 1330 is instructed to resume issuing commands.

The following is a consideration of processor resources (processing capability) allocated to a thread performing a busy-wait (in the above example, the second thread) and to a thread not performing a busy-wait, i.e. to a thread performing regular processing (in the above example, the first thread) during power saving control.

The processor resources allocated to each thread are generally represented by the formula "time slice for a thread÷sum of time slices for all threads×number of execution units 1350 in operation".

In this example, the number of execution units 1350 in operation during power saving control is reduced for the first thread to ¾ the number during normal power control. During power saving control, however, the "time slice for a thread÷sum of time slices for all threads" is increased to 4/3 the value during normal power control (from 100÷200 to 100÷150). The product of these two values is one. On the other hand, the product of these two values is ½ for the second thread.

Therefore, in this example, the processor resources allocated to the thread that is not performing a busy-loop, i.e. to the first thread, do not decrease even during power saving control.

With this structure, the processing speed of a thread that is not performing a busy-loop is maintained, while processing capability allocated to a thread in a busy-loop is selected for reduction. The power wasted by the processor 2901 executing the busy-wait can thus be reduced, as can the power wasted by the computer system 2900.

The above power saving control can also be considered as follows.

In the above example, the processor resources corresponding to the reduction in the time slice allocated to the thread in a busy-wait are "50÷200×number of execution units in operation", as per the above formula. In other words, the reduction in the time slice corresponds to ¼ of the processing resources during normal power control.

Therefore, if the number of execution units 1350 in operation is reduced by ¼ in response to the above "¼ of the processing resources", the power consumption of the processor 2901 can be reduced without reducing the processor resources for the thread that is not in a busy-wait. Furthermore, when a particular thread in a busy-wait exits the busy-wait, the processor resources allocated to the particular thread can be increased, without decreasing the processor resources allocated to other threads, by increasing the number of execution units 1350 in operation.

In this way, the above power saving control reduces the number of execution units in operation in response to the reduction in the time slice allocated to a thread in a busy-wait.

(3) Supplementary Explanation of Power Saving Control

By combining the two above types of power saving control, the processor resources (processing capability) allocated to each thread is "time slice for a thread÷sum of time slices for all threads×frequency of clock 1307×number of execution units 1350 in operation".

Based on the above calculation, the present embodiment allows for the processor resources for a thread performing a busy-loop to be selected for reduction without reducing the processor resources for a thread not performing a busy-loop.

Furthermore, during power saving control, at least one of the frequency of the clock 1307 and the number of execution units 1350 in operation can be reduced in response to the reduction in the time slice allocated to a thread in a busy-wait.

Note that during power saving control, the processor resources for threads not performing a busy-loop may be increased. In this case as well, the amount of power wasted by performing a busy-loop can be reduced.

In Embodiment 2, the power saving control, as well as the control to terminate power saving control and return to normal power control, may be of a different form than the power saving control 1 and the power saving control 2 above. For example, the following forms of control are possible.

The power saving control may be performed by reducing the voltage of the power 1306 provided to the processor 2901, or by reducing both the voltage of the power 1306 provided to the processor 2901 and the frequency of the clock 1307. The control to terminate power saving control and return to normal power control may be performed by increasing the voltage of the power 1306 provided to the processor 2901 or by increasing both the voltage of the power 1306 provided to the processor 2901 and the frequency of the clock 1307.

Furthermore, the power saving control may be performed by reducing the number of execution units 1350 in operation as well as reducing the voltage of the power 1306 provided to the processor 2901. Alternatively, the power saving control may be performed by reducing the number of execution units 1350 in operation, the voltage of the power 1306 provided to the processor 2901, and the frequency of the clock 1307. The control to terminate power saving control and return to normal power control may be performed by increasing the number of execution units 1350 in operation as well as the voltage of the power 1306 provided to the processor 2901. Alternatively, the control to terminate power saving control and return to normal power control may be performed by increasing the number of execution units 1350 in operation, the voltage of the power 1306 provided to the processor 2901, and the frequency of the clock 1307.

Note that the target of control by the first power control unit 3013 and the second power control unit 3015 is not limited to the voltage of the power 1306, the frequency of the clock 1307, and the number of execution units 1350 in operation.

The target of control by the first power control unit 3013 and the second power control unit 3015 may be the power provided to the processor 2901 or the computer system 2900.

Embodiment 3

The structure of a computer system in Embodiment 3 is now described with reference to FIG. 26.

Figure 26:
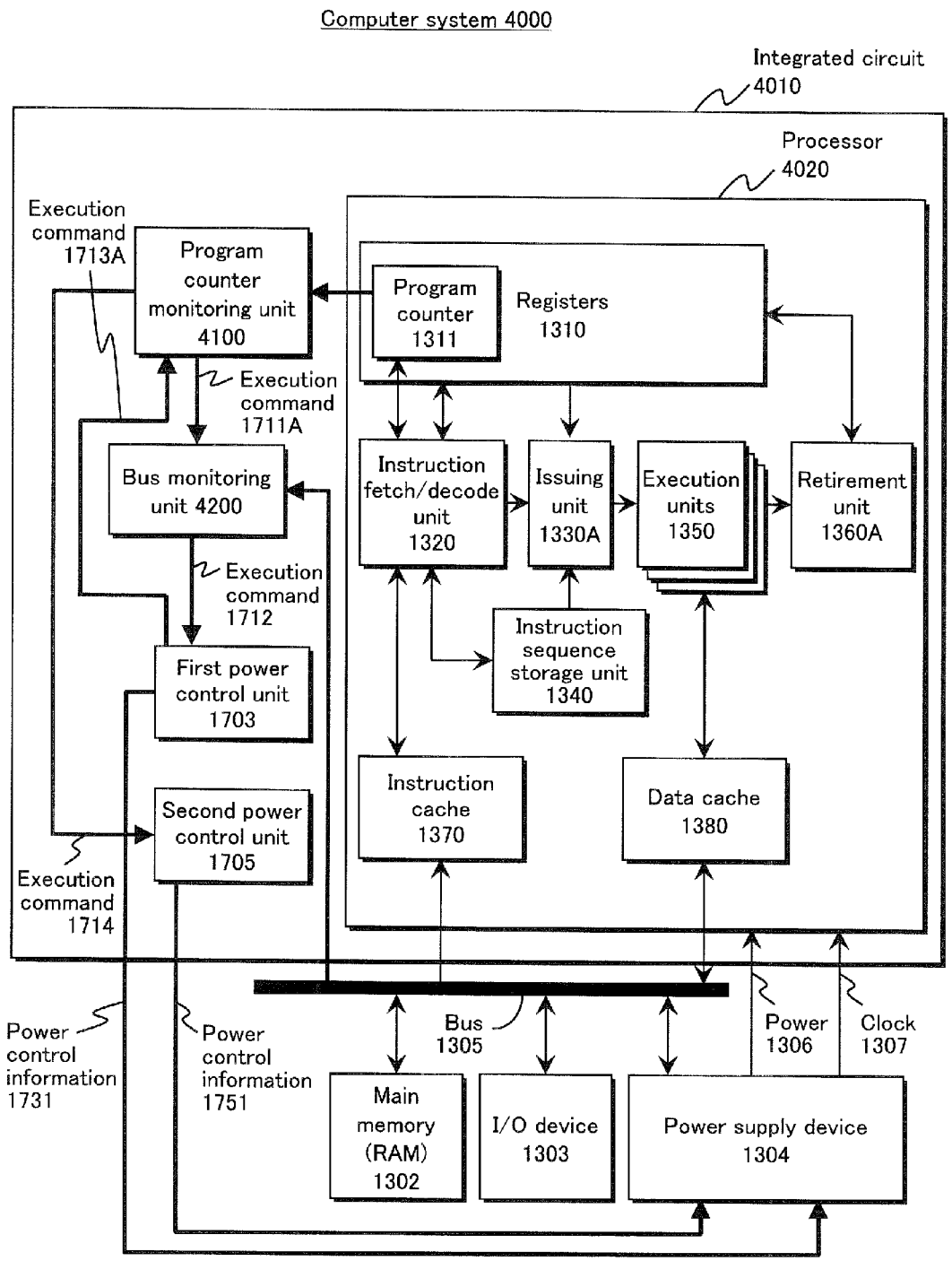
FIG. 26 schematically shows the structure of a computer system 4000 in Embodiment 3.

In FIG. 26, constituent elements that are the same as the computer system 1300 in FIG. 1 are indicated with the same reference signs, and a description thereof is omitted.

A computer system 4000 in Embodiment 3 differs from the computer system 1300 in Embodiment 1 in the following points.

(i) The computer system 4000 is provided with a program counter monitoring unit 4100 instead of the loop detection unit 1701 and the loop exit detection unit 1704.

(ii) The computer system 4000 is provided with a bus monitoring unit 4200 instead of the loop-carried dependence analysis unit 1702.

<Processor>

A processor 4020 in an integrated circuit 4010 has the same structure as the processor 1301 in Embodiment 1, excluding the power saving control device (i.e. the loop detection unit 1701, the loop-carried dependence analysis unit 1702, the first power control unit 1703, the loop exit detection unit 1704, and the second power control unit 1705). An issuing unit 1330A has the same structure as the issuing unit 1330 in Embodiment 1, excluding the loop-carried dependence analysis unit 1702. A retirement unit 1360A has the same structure as the retirement unit 1360 in Embodiment 1, excluding the loop detection unit 1701 and the loop exit detection unit 1704.

<Power Saving Control Device>

In Embodiment 3, a power saving control device is constituted by a program counter monitoring unit 4100, a bus monitoring unit 4200, a first power control unit 1703, and a second power control unit 1705. A portion or the entirety of the program counter monitoring unit 4100, the bus monitoring unit 4200, the first power control unit 1703, and the second power control unit 1705 may be provided within the processor.

(1-1) Program Counter Monitoring Unit 4100 (Operations Related to Power Saving Control)

Figure 27:
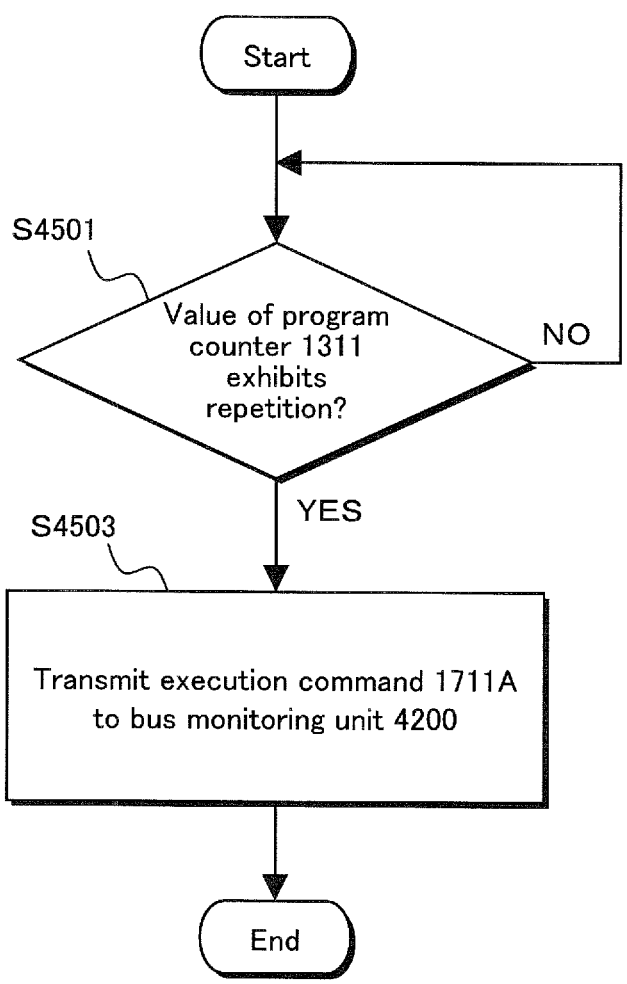
FIG. 27 is a flowchart showing operations related to power saving control by a program counter monitoring unit 4100 in Embodiment 3.

Operations related to power saving control by the program counter monitoring unit 4100 are now described with reference to the flowchart in FIG. 27. Note that the flowchart in FIG. 27 focuses on how, while the processor 4020 is executing a loop, the value of the program counter 1311 exhibits repetition of a fixed pattern.

In step S4501, the program counter monitoring unit 4100 monitors whether the value of the program counter 1311 exhibits repetition of a fixed pattern. If the result of determination in step S4501 is NO (if the value of the program counter 1311 does not exhibit repetition of a fixed pattern), processing returns to step S4501. If the result of determination in step S4501 is YES (if the value of the program counter 1311 does exhibit repetition of a fixed pattern), processing proceeds to step S4503.

In step S4503, the program counter monitoring unit 4100 transmits an execution command 1711A to perform bus monitoring to the bus monitoring unit 4200.

(1-2) Bus Monitoring Unit 4200

Figure 28:
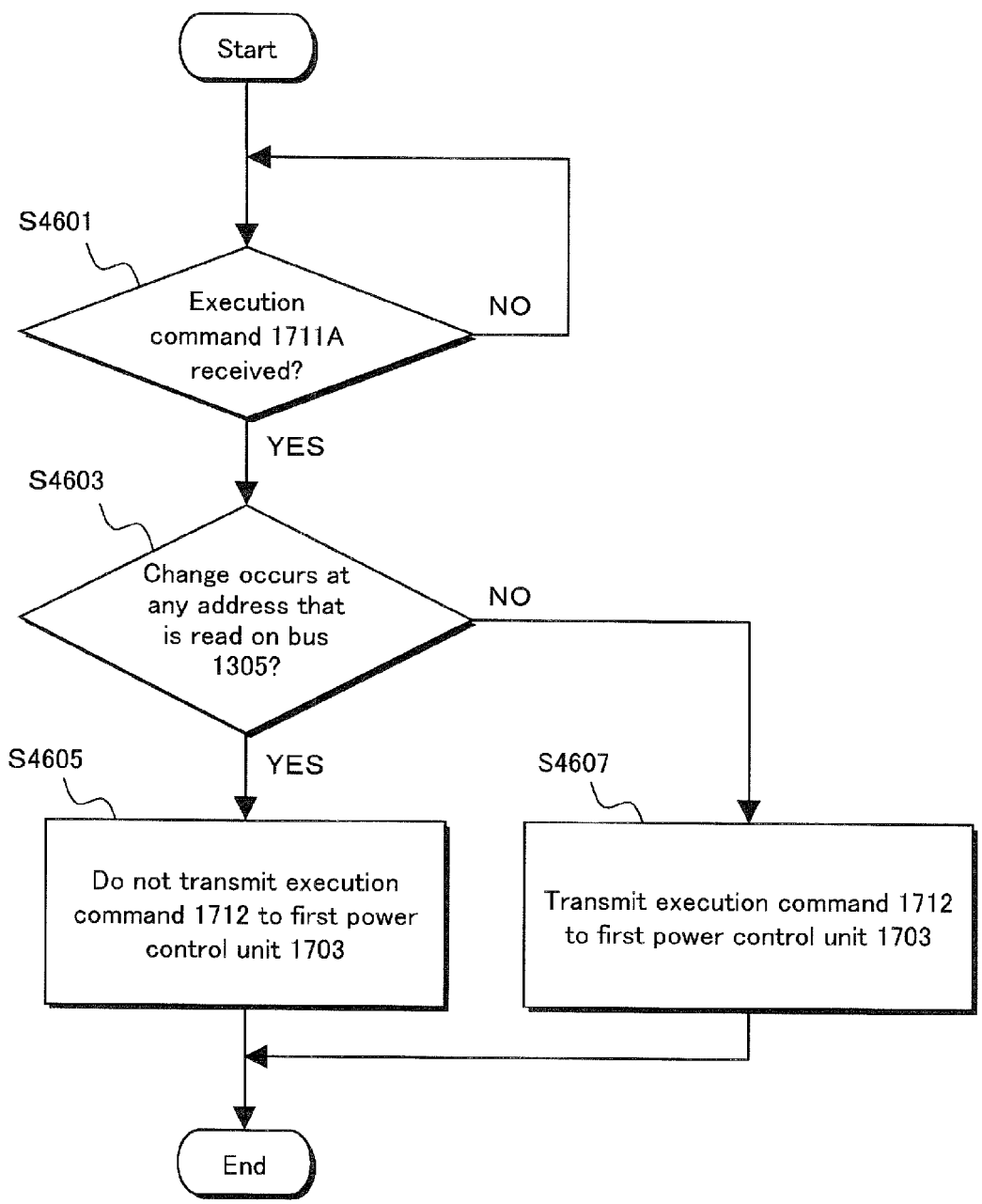
FIG. 28 is a flowchart showing operations by a bus monitoring unit 4200 in Embodiment 3.

Operations by the bus monitoring unit 4200 are described with reference to the flowchart in FIG. 28. Note that the flowchart in FIG. 28 focuses on how, when the processor 4020 is executing a loop, there may be no change at any address that is read if there is no loop-carried dependence in the loop.

In step S4601, the bus monitoring unit 4200 receives the execution command 1711A from the program counter monitoring unit 4100. If the result of determination in step S4601 is YES, processing proceeds to step S4603. If the result of determination in step S4601 is NO, the determination in step S4601 is repeated.

In step S4603, the bus monitoring unit 4200 monitors the bus 1305 and determines whether change occurs at any address that is read. If the result of determination in step S4603 is YES (if there is a change at any address that is read), processing proceeds to step S4605. If the result of determination in step S4603 is NO (if there is no change at any address that is read), processing proceeds to step S4607.

In step S4605, the bus monitoring unit 4200 does not transmit an execution command 1712 to perform power saving control to the first power control unit 1703.

In step S4607, the bus monitoring unit 4200 does transmit an execution command 1712 to perform power saving control to the first power control unit 1703. Note that upon receiving the execution command 1712 from the bus monitoring unit 4200, the first power control unit 1703 both transmits power control information 1731 to a power supply device 1304 and transmits an execution command 1713A to detect termination of power saving control to the program counter monitoring unit 4100. The forms of power saving control described in Embodiment 1 are adopted for the power saving control by the first power control unit 1703.

(1-3) Program Counter Monitoring Unit 4100 (Operations Related to Terminating Power Saving Control)

Figure 29:
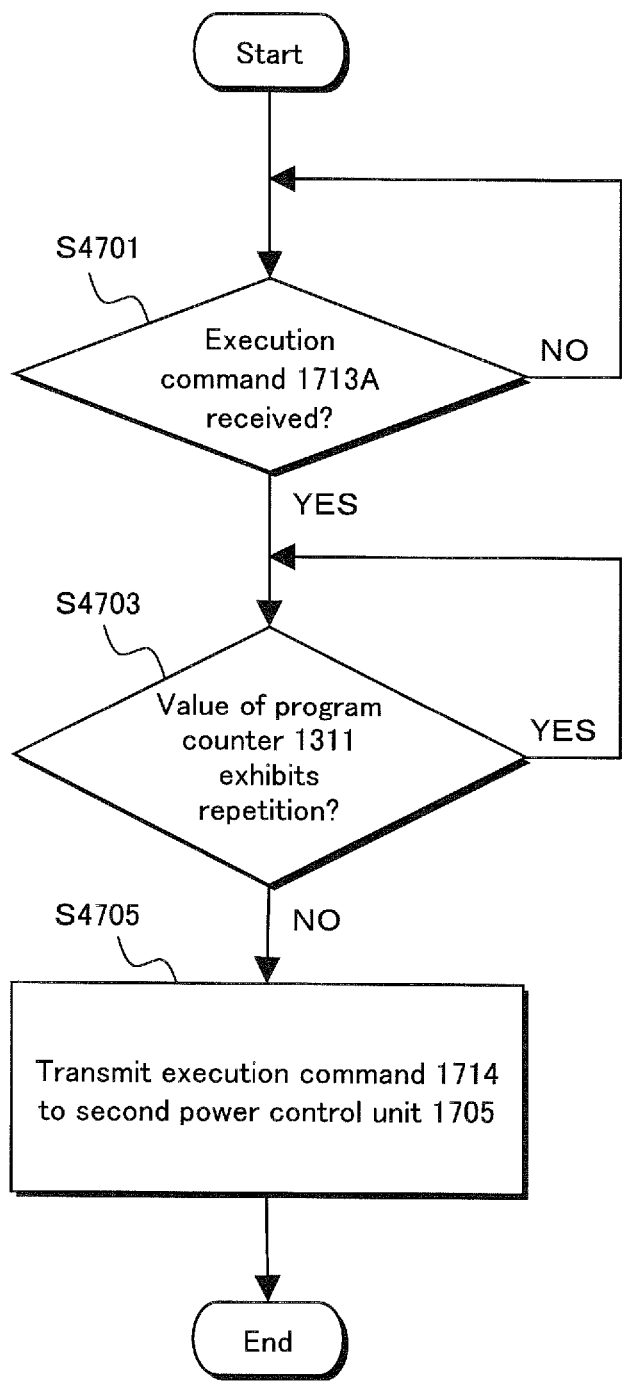
FIG. 29 is a flowchart showing operations related to termination of power saving control by a program counter monitoring unit 4100 in Embodiment 3.

Operations related to terminating power saving control by the program counter monitoring unit 4100 are now described with reference to the flowchart in FIG. 29. Note that the flowchart in FIG. 29 focuses on how, after the processor 4020 finishes executing a loop, the value of the program counter 1311 diverges from the repetition of a fixed pattern exhibited during loop processing.

In step S4701, the program counter monitoring unit 4100 receives the execution command 1713A from the first power control unit 1703. If the result of determination in step S4701 is YES, processing proceeds to step S4703. If the result of determination in step S4701 is NO, the determination in step S4701 is repeated.

In step S4703, the program counter monitoring unit 4100 monitors whether the value of the program counter 1311 exhibits repetition of the same fixed pattern as the fixed pattern at the time of the determination in step S4501. If the result of determination in step S4703 is YES (if the value of the program counter 1311 exhibits repetition of the same fixed pattern), the processor 4020 is still executing the loop. Processing thus returns to step S4703. If the result of determination in step S4703 is NO (if the value of the program counter 1311 does not exhibit repetition of a fixed pattern), the processor 4020 is considered to have finished executing the loop, and processing proceeds to step S4703.

In step S4705, the program counter monitoring unit 4100 transmits an execution command 1714 to terminate power saving control to the second power control unit 1705. Upon receiving the execution command 1714 from the program counter monitoring unit 4100, the second power control unit 1705 transmits power control information 1735 to the power supply device 1304. The forms of control to terminate power saving control and return to normal power control described in Embodiment 1 are adopted for the control to terminate power saving control and return to normal power control by the second power control unit 1705.

Embodiment 4

The structure of a computer system in Embodiment 4 is now described with reference to FIG. 30.

Figure 30:
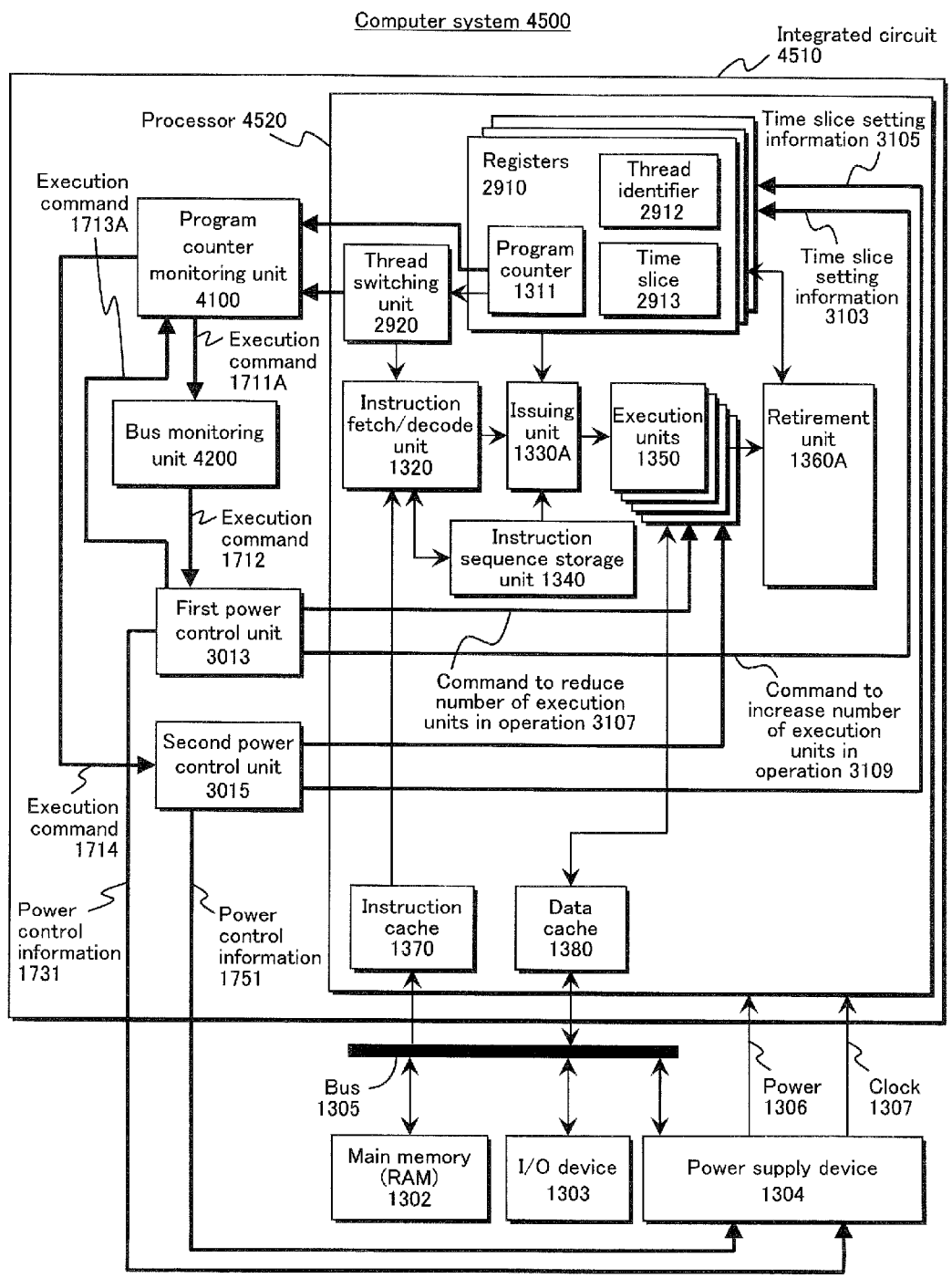
FIG. 30 schematically shows the structure of a computer system 4500 in Embodiment 4.

In FIG. 30, constituent elements that are the same as the computer system 2900 in FIG. 20 or the computer system 4000 in FIG. 26 are indicated with the same reference signs, and a description thereof is omitted.

A computer system 4500 in Embodiment 4 differs from the computer system 2900 in Embodiment 2 in the following points.

(i) The computer system 4500 is provided with a program counter monitoring unit 4100 instead of the loop detection unit 1701 and the loop exit detection unit 1704.

(ii) The computer system 4500 is provided with a bus monitoring unit 4200 instead of the loop-carried dependence analysis unit 1702.

<Processor>

A processor 4520 in an integrated circuit 4510 has the same structure as the processor 2901 in Embodiment 2, excluding the power saving control device (i.e. the loop detection unit 1701, the loop-carried dependence analysis unit 1702, the first power control unit 3013, the loop exit detection unit 1704, and the second power control unit 3015).

<Power Saving Control Device>

In Embodiment 4, a power saving control device is constituted by a program counter monitoring unit 4100, a bus monitoring unit 4200, a first power control unit 3013, and a second power control unit 3015. A portion or the entirety of the program counter monitoring unit 4100, the bus monitoring unit 4200, the first power control unit 3013, and the second power control unit 3105 may be provided within the processor.

(1-1) Program Counter Monitoring Unit 4100 (Operations Related to Power Saving Control)

The program counter monitoring unit 4100 receives as input the value of the program counter 1311 for each thread, as well as information from the thread switching unit 2920 indicating the currently operating thread.

The program counter monitoring unit 4100 monitors the program counter 1311 by thread, since the processor 4200 operates while switching between threads. When detecting that the value of the program counter 1311 for the thread corresponding to the information acquired from the thread switching unit 2920 exhibits repetition of a fixed pattern, the program counter monitoring unit 4100 outputs an execution command 1711A to perform bus monitoring to the bus monitoring unit 4200. Note that the execution command 1711A includes information indicating the thread for which the value of the program counter 1311 exhibits repetition of a fixed pattern.

(1-2) Bus Monitoring Unit 4200

Information indicating the thread that is currently in operation is input into the bus monitoring unit 4200 from the thread switching unit 2920.

The bus monitoring unit 4200 monitors the bus 1305 regarding the threads indicated by the information included in each execution command 1711A received from the program counter monitoring unit 4100. If the bus monitoring unit 4200 detects no change at any address that is read by the thread that is currently in operation as indicated by the thread switching unit 2920, the bus monitoring unit 4200 transmits an execution command 1712 to perform power saving control to the first power control unit 3013. The execution command 1712 includes information indicating the thread for which no change was detected at any address that is read.

The first power control unit 3013 transmits an execution command 1713A for termination of power saving control to the program counter monitoring unit 4100. The forms of power saving control described in Embodiment 2 are adopted for the power saving control by the first power control unit 3013. Furthermore, the forms of control to reduce the time slice in Embodiment 2 can be used for control by the first power control unit 3013 to reduce the time slice.

(1-3) Program Counter Monitoring Unit 4100 (Operations Related to Terminating Power Saving Control)

The program counter monitoring unit 4100 monitors the program counter 1311 for the threads indicated by the information included in each execution command 1713A received from the first power control unit 3013. When detecting that the value of the program counter 1311 for the thread that is currently in operation as indicated by the thread switching unit 2920 does not exhibit repetition of a fixed pattern, the program counter monitoring unit 4100 outputs an execution command 1714 to terminate power saving control to the second power control unit 3014. Note that the execution command 1714 includes information indicating the thread for which the value of the program counter 1311 no longer exhibits repetition of a fixed pattern.

The forms of control to terminate power saving control and return to normal power control described in Embodiment 2 are adopted for the control to terminate power saving control and return to normal power control by the second power control unit 3015. Furthermore, the forms of control to increase the time slice in Embodiment 2 can be used for control by the second power control unit 3015 to increase the time slice.

[Other]

(1) The above embodiments and modifications are, in all respects, only examples of the present invention. The above examples in no way limit the scope of the present invention. A variety of improvements and modifications may of course be made without exceeding the scope of the present invention.

(2) In Embodiments 1 and 2 and the modifications thereof, processing is performed wherein a branch instruction is detected after execution by an execution unit, and an instruction sequence in a loop range stored in the instruction sequence storage unit 1340 is analyzed for loop-carried dependence.

Alternatively, the loop detection unit can detect a branch instruction included in an instruction sequence read into the instruction cache 1370 before execution of the instruction sequence, and the detected loop can be analyzed for loop-carried dependence. If a loop for a busy-wait is detected, either the loop range or the address of the branch instruction can be stored in a buffer. As a result, execution of a loop for a busy-wait can be detected upon execution of the instruction at the address stored in the buffer.

In this case, the loop detection unit can be provided at a location outside of the retirement unit 1360. The loop-carried dependence analysis unit can also be provided at a location other than the issuing unit 1330. Furthermore, the unit that performs processing such as fetching instructions from the instruction cache can be provided independently from the instruction fetch/decode unit 1320.

(3) In Embodiments 2 and 4, the number of execution units in operation is reduced during power saving control. Similarly, the number of execution units in operation may be reduced during power saving control in Embodiments 1 and 3 as well.

(4) In Embodiments 1 and 2 and the modifications thereto, the loop detection unit 1704 detects a loop based on the result of execution of a branch instruction or the like. The retirement unit 1360 may be provided with a reordering buffer that stores issued instructions and the address for each instruction. In this case, issuing of a branch instruction can be detected when a branch instruction is transmitted from the issuing unit 1330 to the reordering buffer. Subsequently, execution of the branch instruction may be detected when the result of execution of the branch instruction is transmitted to the retirement unit, or when the result of execution of the branch instruction is retired (such as when the program counter is overwritten).

(5) In Embodiments 1-4 and in the modifications, the power supply device may be provided with a clock frequency storage unit that stores the frequency of the clock provided to the processor. The processor can thus read the clock frequency from the clock frequency storage unit.

A first example and a second example of implementation in this case are provided below.

The first example is to implement the clock frequency storage unit as a memory-mapped register.

The clock frequency storage unit is allocated to a specific address on the bus. The processor reads the clock frequency from the clock frequency storage unit via the bus.

The second example is for the processor to acquire the frequency from the clock frequency storage unit by executing a particular instruction.

The processor reads the clock frequency from the clock frequency storage unit, which is located in the power supply device, when an execution unit executes the particular instruction.

FIG. 31 shows an example of an instruction set 1400A provided with the particular instruction. The instruction set 1400A shown in FIG. 31 is the same as the instruction set 1400 shown in FIG. 4, with the addition of a READCLK instruction 1420. The READCLK instruction 1420 corresponds to the particular instruction executed by the processor to read the clock frequency from the clock frequency storage unit.

(6) In Embodiments 2 and 4, and the modifications thereto, the processor may be allowed to read time slices.

For example, the processor may acquire a time slice by executing a particular instruction.

The processor reads the time slice when an execution unit executes the particular instruction.

FIG. 32 shows an example of an instruction set 1400B provided with the particular instruction. The instruction set 1400B shown in FIG. 32 is the same as the instruction set 1400 shown in FIG. 4, with the addition of a READCLK instruction 1420 and a READTS instruction 1421. The READTS instruction 1421 corresponds to the particular instruction executed by the processor to read the time slice.

Supplementary Explanation

An aspect of the present invention is an integrated circuit provided with a processor, comprising: a loop detection unit configured to detect execution of a loop in the processor, each iteration of the loop including one or more instructions; a loop-carried dependence analysis unit configured to analyze the loop in order to detect loop-carried dependence between instructions in two different iterations of the loop; and a power control unit configured to perform power saving control to reduce power consumed by execution of the loop when the loop-carried dependence analysis unit detects no loop-carried dependence in the loop.

The integrated circuit according to this aspect can detect a loop using the loop detection unit and can distinguish whether the loop is for a busy-wait using the loop-carried dependence analysis unit. Accordingly, the integrated circuit can detect a loop for a busy-wait without comparing the loop with any specific instruction sequence (such as an instruction sequence for an interlock). The integrated circuit can therefore easily detect a loop for a busy-wait formed by an instruction sequence other than specific instruction sequences and perform power saving control during a busy-wait. As a result, a larger variety of busy-waits can be detected, and the amount of power wasted by performing a busy-wait can be reduced.

In this context, loop-carried dependence refers to dependence between an instruction executed in an $i^{th}$ iteration of a loop and an instruction executed in a $j^{th}$ (j>i) iteration of the loop.

Specifically, loop-carried dependence exists if, for example, the value written into a specific variable (register) by any instruction in the $i^{th}$ iteration of the loop is read from the specific variable (register) by any instruction in the $j^{th}$ iteration of the loop. If loop-carried dependence exists in a loop, the loop is determined not to be for a busy-wait, but rather for calculation or the like. Such a loop is not targeted for power saving control.

With reference to the figures, the following describes an example of a loop with loop-carried dependence and a loop without loop-carried dependence.

First, an example of a loop with loop-carried dependence is described with reference to FIG. 11.

The instruction sequence 2600 in FIG. 11 is composed of a loop from address 2004 to address 2010.

The ADD instruction at address 2004 adds four to the value of the R2 register and inputs the result into the R2 register. Next, the LDR instruction at address 2008 reads the value at the address indicated by the R2 register into the R0 register. The CMP instruction at address 200c then compares the value of the R0 register with the value of the R1 register, which has a pre-stored value. If the values match, the loop is exited by a BNE instruction at address 2010. If the values do not match, the BNE instruction at address 2010 causes processing to branch to address 2004.

In the loop composed of the instruction sequence 2600 shown in FIG. 11, the value of the register (R2 register) written by the ADD instruction at address 2004 is read by the same instruction (the ADD instruction at address 2004) in the next iteration. Accordingly, the loop composed of the instruction sequence 2600 shown in FIG. 11 corresponds to a loop in which the value written into a specific register by an instruction in the $i^{th}$ iteration of the loop is read from the specific register by an instruction in the $j^{th}$ (j>i) iteration of the loop. Therefore, loop-carried dependence exists in the loop composed of the instruction sequence 2600 shown in FIG. 11.

Such a loop with loop-carried dependence is determined not to be a loop for a busy-wait and therefore is not targeted for power saving control.

Next, an example of a loop without loop-carried dependence is described with reference to FIG. 8.

The instruction sequence 2100 in FIG. 8 is composed of a loop from address 1004 to address 1010.

The LDR instruction at address 1008 reads the address indicated by the R2 register into the R0 register. Next, the CMP instruction at address 100c compares the value of the R0 register with the value of an R1 register, which has a pre-stored value. If the values match, the loop is exited by a BNE instruction at address 1010. In other words, the loop terminates by the branch not being taken. On the other hand, if the values do not match, the BNE instruction at address 1010 causes processing to branch to address 1004. In other words, the branch is taken.

What is of particular note in the instruction sequence 2100 shown in FIG. 8 is that the value of the register written during the earlier iteration is not read during the later iteration. The only register that is written during the loop is the R0 register. The value written into the R0 register during the earlier iteration is not read during the later iteration. Accordingly, the loop composed of the instruction sequence 2100 shown in FIG. 8 is a loop in which the value written into a specific register by an instruction in the $i^{th}$ iteration of the loop is not read by an instruction in the $j^{th}$ (j>i) iteration of the loop. Therefore, loop-carried dependence does not exist in the loop composed of the instruction sequence shown in FIG. 8. Such a loop with no loop-carried dependence is determined to be a loop for a busy-wait and therefore is targeted for power saving control.

Detection of the loop may be performed after or before execution of instructions included in the loop. Furthermore, a loop may be detected in an instruction sequence stored in an instruction cache.

As long as the detection of loop-carried dependence is performed after loop detection, the detection of loop-carried dependence may be performed after or before execution of instructions included in the loop.

A control method according to an aspect of the present invention is a control method for a computer system provided with a processor, comprising the steps of: detecting execution of a loop in the processor, each iteration of the loop including one or more instructions; analyzing the loop in order to detect loop-carried dependence between instructions in two different iterations of the loop; and performing power saving control to reduce power consumed by execution of the loop when no loop-carried dependence is detected in the loop.

A computer system according to an aspect of the present invention is a computer system provided with a processor, comprising: a loop detection unit configured to detect execution of a loop in the processor, each iteration of the loop including one or more instructions; a loop-carried dependence analysis unit configured to analyze the loop in order to detect loop-carried dependence between instructions in two different iterations of the loop; and a power control unit configured to perform power saving control to reduce power consumed by execution of the loop when the loop-carried dependence analysis unit detects no loop-carried dependence in the loop.

The control method and the computer system according to aspects of the present invention achieve the same advantageous effects as the integrated circuit according to the above aspect of the present invention.

The integrated circuit according to an aspect of the present invention may further comprise a loop termination detection unit configured to detect termination of execution of the loop, wherein while performing the power saving control, the power control unit terminates the power saving control when the loop termination detection unit detects the termination of execution of the loop.

In the integrated circuit according to an aspect of the present invention, the loop-carried dependence analysis unit may detect the loop-carried dependence in the loop by detecting that a value written into a variable in a first iteration is read from the variable in a second iteration executed after the first iteration.

In the integrated circuit according to an aspect of the present invention, the loop detection unit may detect that the processor is executing a loop by detecting that the processor executes a branch instruction that branches to a previous address.

The integrated circuit according to an aspect of the present invention may further comprise a loop range storage unit for storing a range of the loop, wherein upon detecting the branch instruction that branches to a previous address, the loop detection unit outputs the range of the loop to the loop range storage unit and instructs the loop-carried dependence analysis unit to analyze for loop-carried dependence, and the loop-carried dependence analysis unit analyzes an instruction sequence in the range of the loop stored in the loop range storage unit.

In the integrated circuit according to an aspect of the present invention, the loop termination detection unit may detect the termination of execution of a loop by detecting that a branch instruction has been executed to branch outside of the range of the loop stored in the loop range storage unit, or by detecting that when a conditional branch instruction located at an end of the range of the loop is executed, a branch is not taken.

In the integrated circuit according to an aspect of the present invention, the loop range storage unit may store information including a starting address and an ending address of the loop.

In the integrated circuit according to an aspect of the present invention, the processor may be provided with an instruction sequence storage unit for storing a fetched instruction sequence, and the loop-carried dependence analysis unit may analyze the instruction sequence in the range of the loop stored in the instruction sequence storage unit.

In the integrated circuit according to an aspect of the present invention, the instruction sequence stored in the instruction sequence storage unit may include a pre-fetched instruction.

In the integrated circuit according to an aspect of the present invention, the power control unit may perform the power saving control by decreasing a frequency of a clock provided to the processor and terminate the power saving control by increasing the frequency of the clock provided to the processor. By reducing the frequency of the clock, the power that is wasted by a busy-wait can be reduced.

In the integrated circuit according to an aspect of the present invention, the power control unit may perform the power saving control by decreasing voltage of power provided to the processor and terminate the power saving control by increasing the voltage of power provided to the processor. By reducing the voltage of the power, the power that is wasted by a busy-wait can be reduced.

In the integrated circuit according to an aspect of the present invention, the power control unit may perform the power saving control by decreasing both voltage of power provided to the processor and a frequency of a clock provided to the processor and terminate the power saving control by increasing both the voltage of power provided to the processor and the frequency of the clock provided to the processor. By reducing the frequency of the clock and the voltage of the power, the power that is wasted by a busy-wait can be reduced.

In the integrated circuit according to an aspect of the present invention, the loop-carried dependence analysis unit may detect the loop-carried dependence when an instruction in the loop reads from and writes to a same variable.

In the integrated circuit according to an aspect of the present invention, the processor may be provided with a plurality of execution units, and the power control unit may perform the power saving control by stopping execution of a portion of the plurality of execution units and terminate the power saving control by restarting execution of the portion of the plurality of execution units whose execution was stopped. By stopping a portion of the plurality of execution units, the power that is wasted by a busy-wait can be reduced.

In the integrated circuit according to an aspect of the present invention, the processor may be provided with a thread management unit configured to manage time slices allocated in one-to-one correspondence to a plurality of threads, and the power control unit may perform the power saving control by instructing the thread management unit to decrease the time slice allocated to a thread in a busy-wait, the thread in the busy-wait executing a loop in which no loop-carried dependence is detected, and terminate the power saving control by instructing the thread management unit to increase the time slice allocated to the thread in the busy-wait. By decreasing the time slice allocated to a thread in a busy-wait, the power that is wasted by a busy-wait can be reduced.

In the integrated circuit according to an aspect of the present invention, the power control unit may perform the power saving control by instructing the thread management unit to decrease the time slice allocated to the thread in the busy-wait and by decreasing a frequency of a clock provided to the processor, and terminate the power saving control by instructing the thread management unit to increase the time slice allocated to the thread in the busy-wait and by increasing the frequency of the clock provided to the processor. This structure allows both for reduction in the power wasted by a busy-wait as well as the power consumed by the processor.

In the integrated circuit according to an aspect of the present invention, the processor may be provided with a plurality of execution units, and the power control unit may perform the power saving control by instructing the thread management unit to decrease the time slice allocated to the thread in the busy-wait and by stopping execution of a portion of the plurality of execution units, and terminate the power saving control by instructing the thread management unit to increase the time slice allocated to the thread in the busy-wait and by restarting execution of the portion of the plurality of execution units. This structure allows both for reduction in the power wasted by a busy-wait as well as the power consumed by the processor.

In the integrated circuit according to an aspect of the present invention, the processor may be provided with a plurality of execution units, and the power control unit may perform the power saving control by instructing the thread management unit to decrease the time slice allocated to the thread in the busy-wait, by decreasing a frequency of a clock provided to the processor, and by stopping execution of a portion of the plurality of execution units, and terminate the power saving control by instructing the thread management unit to increase the time slice allocated to the thread in the busy-wait, by increasing the frequency of the clock provided to the processor, and by restarting execution of the portion of the plurality of execution units. This structure allows both for reduction in the power wasted by a busy-wait as well as the power consumed by the processor.

In the integrated circuit according to an aspect of the present invention, the power control unit may perform the power saving control by instructing the thread management unit to decrease the time slice allocated to the thread in the busy-wait, by decreasing a frequency of a clock provided to the processor, and by decreasing voltage of power provided to the processor, and terminate the power saving control by instructing the thread management unit to increase the time slice allocated to the thread in the busy-wait, by increasing the frequency of the clock provided to the processor, and by increasing the voltage of power provided to the processor. This structure allows both for reduction in the power wasted by a busy-wait as well as the power consumed by the processor. This structure allows both for reduction in the power wasted by a busy-wait as well as the power consumed by the processor.

In the integrated circuit according to an aspect of the present invention, the power control unit may perform the power saving control by decreasing the frequency of the clock provided to the processor in proportion to a decrease in the time slice allocated to the thread in the busy-wait.

In the integrated circuit according to an aspect of the present invention, the power control unit may perform the power saving control by decreasing a number of execution units in operation among the plurality of execution units in proportion to a decrease in the time slice allocated to the thread in the busy-wait.

An integrated circuit according to another aspect of the present invention is an integrated circuit provided with a processor, comprising: a first monitoring unit configured to monitor whether a value of a program counter in the processor exhibits repetition of a fixed pattern; a second monitoring unit configured to monitor a bus connected to the processor to determine whether change occurs at an address read by the processor; and a power control unit configured to perform power saving control, in order to reduce power consumed by the processor, upon the first monitoring unit detecting that the value of the program counter exhibits repetition of a fixed pattern and the second monitoring unit detecting that no change occurs at the address read by the processor.

A control method according to another aspect of the present invention is a control method for a computer system provided with a processor, comprising the steps of: monitoring whether a value of a program counter in the processor exhibits repetition of a fixed pattern; monitoring a bus connected to the processor to determine whether change occurs at an address read by the processor; and performing power saving control, in order to reduce power consumed by the processor, upon detection that the value of the program counter exhibits repetition of a fixed pattern and detection that no change occurs at the address read by the processor.

A computer system according to another aspect of the present invention is a computer system provided with a processor, comprising: a first monitoring unit configured to monitor whether a value of a program counter in the processor exhibits repetition of a fixed pattern; a second monitoring unit configured to monitor a bus connected to the processor to determine whether change occurs at an address read by the processor; and a power control unit configured to perform power saving control, in order to reduce power consumed by the processor, upon the first monitoring unit detecting that the value of the program counter exhibits repetition of a fixed pattern and the second monitoring unit detecting that no change occurs at the address read by the processor.

The integrated circuit, control method, and computer system according to other aspects of the present invention allow for reduction of the power wasted by executing a variety of busy-waits.

In the integrated circuit according to another aspect of the present invention, while performing the power saving control, the power control unit may terminate the power saving control when the first monitoring unit detects that the value of the program counter stops exhibiting repetition of the fixed pattern.

INDUSTRIAL APPLICABILITY

An integrated circuit according to the present invention is provided with a processor, a function to detect when the processor is performing a busy-wait, and a function to perform power saving control during the busy-wait. Therefore, the integrated circuit is useful when integrated into a computer system.

Examples of computer systems in which the present invention can be adopted include personal computers, mainframes, televisions, video decks, HDD recorders, mobile phones, car navigation systems, land-line phones, copy machines, network relay devices, mobile terminals with a touchscreen, game consoles, and the like.

REFERENCE SIGNS LIST 1300 computer system
1301 processor
1302 main memory
1303 I/O device
1304 power supply device
1305 bus
1306 power
1307 clock
1310 register
1311 program counter
1320 instruction fetch/decode unit
1330 issuing unit
1340 instruction sequence storage unit
1350 execution unit
1360 retirement unit
1370 instruction cache
1380 data cache
1400 instruction set
1500 register set
1512 program counter
1513 condition flag register
1701 loop detection unit
1702 loop-carried dependence analysis unit
1703 first power control unit
1704 loop exit detection unit
1705 second power control unit
1900 loop range storage unit
2200 dependence analysis buffer
2202 DST register
2203 SRC register
2700 dependence analysis buffer
2800 computer system
2851 flow dependence detection circuit
2853 preliminary detection circuit
2855 instruction buffer
2857 comparison circuit
2861 instruction buffer
2871 simplified loop-carried dependence detection circuit
2900 computer system 2901 processor
2910 register
2912 thread identifier register
2913 time slice register
2920 thread switching unit
3013 first power control unit
3015 second power control unit

The invention claimed is:

1. An integrated circuit provided with a processor, comprising:
 a loop detection unit configured to detect execution of a loop in the processor, each iteration of the loop including one or more instructions;
 a loop-carried dependence analysis unit configured to analyze the loop in order to detect loop-carried dependence between instructions in two different iterations of the loop;
 a power control unit configured to perform power saving control to reduce power consumed by execution of the loop when the loop-carried dependence analysis unit detects no loop-carried dependence in the loop; and
 a loop termination detection unit configured to detect termination of execution of the loop, wherein
 while performing the power saving control, the power control unit terminates the power saving control when the loop termination detection unit detects the termination of execution of the loop.

2. The integrated circuit of claim 1, wherein
the loop-carried dependence analysis unit detects the loop-carried dependence in the loop by detecting that a value written into a variable in a first iteration is read from the variable in a second iteration executed after the first iteration.

3. The integrated circuit of claim 2, wherein
the loop detection unit detects that the processor is executing a loop by detecting that the processor executes a branch instruction that branches to a previous address.

4. The integrated circuit of claim 3, further comprising:
a loop range storage unit for storing a range of the loop, wherein
upon detecting the branch instruction that branches to a previous address, the loop detection unit outputs the range of the loop to the loop range storage unit and instructs the loop-carried dependence analysis unit to analyze for loop-carried dependence, and
the loop-carried dependence analysis unit analyzes an instruction sequence in the range of the loop stored in the loop range storage unit.

5. The integrated circuit of claim 4, wherein
the loop termination detection unit detects the termination of execution of a loop by detecting that a branch instruction has been executed to branch outside of the range of the loop stored in the loop range storage unit, or by detecting that when a conditional branch instruction located at an end of the range of the loop is executed, a branch is not taken.

6. The integrated circuit of claim 4, wherein
the loop range storage unit stores information including a starting address and an ending address of the loop.

7. The integrated circuit of claim 4, wherein
the processor is provided with an instruction sequence storage unit for storing a fetched instruction sequence, and
the loop-carried dependence analysis unit analyzes the instruction sequence in the range of the loop stored in the instruction sequence storage unit.

8. The integrated circuit of claim 7, wherein
the instruction sequence stored in the instruction sequence storage unit includes a pre-fetched instruction.

9. The integrated circuit of claim 1, wherein
the power control unit performs the power saving control by decreasing a frequency of a clock provided to the processor and terminates the power saving control by increasing the frequency of the clock provided to the processor.

10. The integrated circuit of claim 1, wherein
the power control unit performs the power saving control by decreasing voltage of power provided to the processor and terminates the power saving control by increasing the voltage of power provided to the processor.

11. The integrated circuit of claim 1, wherein
the power control unit
 performs the power saving control by decreasing both voltage of power provided to the processor and a frequency of a clock provided to the processor and
 terminates the power saving control by increasing both the voltage of power provided to the processor and the frequency of the clock provided to the processor.

12. The integrated circuit of claim 1, wherein
the processor is provided with a plurality of execution units, and
the power control unit performs the power saving control by stopping execution of a portion of the plurality of execution units and terminates the power saving control by restarting execution of the portion of the plurality of execution units whose execution was stopped.

13. The integrated circuit of claim 1, wherein
the processor is provided with a thread management unit configured to manage time slices allocated in one-to-one correspondence to a plurality of threads, and
the power control unit
 performs the power saving control by instructing the thread management unit to decrease the time slice allocated to a thread in a busy-wait, the thread in the busy-wait executing a loop in which no loop-carried dependence is detected, and
 terminates the power saving control by instructing the thread management unit to increase the time slice allocated to the thread in the busy-wait.

14. The integrated circuit of claim 13, wherein
the power control unit
 performs the power saving control by instructing the thread management unit to decrease the time slice allocated to the thread in the busy-wait and by decreasing a frequency of a clock provided to the processor, and
 terminates the power saving control by instructing the thread management unit to increase the time slice allocated to the thread in the busy-wait and by increasing the frequency of the clock provided to the processor.

15. The integrated circuit of claim 14, wherein
the power control unit performs the power saving control by decreasing the frequency of the clock provided to the processor in proportion to a decrease in the time slice allocated to the thread in the busy-wait.

16. The integrated circuit of claim 13, wherein
the processor is provided with a plurality of execution units, and
the power control unit
 performs the power saving control by instructing the thread management unit to decrease the time slice allocated to the thread in the busy-wait and by stopping execution of a portion of the plurality of execution units, and terminates the power saving control by instructing the thread management unit to increase the time slice allocated to the thread in the busy-wait and by restarting execution of the portion of the plurality of execution units.

17. The integrated circuit of claim 16, wherein the power control unit performs the power saving control by decreasing a number of execution units in operation among the plurality of execution units in proportion to a decrease in the time slice allocated to the thread in the busy-wait.

18. The integrated circuit of claim 13, wherein the processor is provided with a plurality of execution units, and the power control unit performs the power saving control by instructing the thread management unit to decrease the time slice allocated to the thread in the busy-wait, by decreasing a frequency of a clock provided to the processor, and by stopping execution of a portion of the plurality of execution units, and terminates the power saving control by instructing the thread management unit to increase the time slice allocated to the thread in the busy-wait, by increasing the frequency of the clock provided to the processor, and by restarting execution of the portion of the plurality of execution units.

19. The integrated circuit of claim 13, wherein the power control unit performs the power saving control by instructing the thread management unit to decrease the time slice allocated to the thread in the busy-wait, by decreasing a frequency of a clock provided to the processor, and by decreasing voltage of power provided to the processor, and terminates the power saving control by instructing the thread management unit to increase the time slice allocated to the thread in the busy-wait, by increasing the frequency of the clock provided to the processor, and by increasing the voltage of power provided to the processor.

20. An integrated circuit provided with a processor, comprising:

a loop detection unit configured to detect execution of a loop in the processor, each iteration of the loop including one or more instructions;

a loop-carried dependence analysis unit configured to analyze the loop in order to detect loop-carried dependence between instructions in two different iterations of the loop; and a power control unit configured to perform power saving control to reduce power consumed by execution of the loop when the loop-carried dependence analysis unit detects no loop-carried dependence in the loop, wherein the loop-carried dependence analysis unit detects the loop-carried dependence when an instruction in the loop reads from and writes to a same variable.

21. A control method for a computer system provided with a processor, comprising the steps of:

detecting execution of a loop in the processor, each iteration of the loop including one or more instructions;

analyzing the loop in order to detect loop-carried dependence between instructions in two different iterations of the loop;

performing power saving control to reduce power consumed by execution of the loop when no loop-carried dependence is detected in the loop; and detecting termination of execution of the loop, wherein while performing the power saving control, the power saving control is terminated when the termination of execution of the loop is detected.

22. A computer system provided with a processor, comprising:

a loop detection unit configured to detect execution of a loop in the processor, each iteration of the loop including one or more instructions;

a loop-carried dependence analysis unit configured to analyze the loop in order to detect loop-carried dependence between instructions in two different iterations of the loop;

a power control unit configured to perform power saving control to reduce power consumed by execution of the loop when the loop-carried dependence analysis unit detects no loop-carried dependence in the loop; and a loop termination detection unit configured to detect termination of execution of the loop, wherein, while performing the power saving control, the power control unit terminates the power saving control when the loop termination detection unit detects the termination of execution of the loop.

* * * * *